US010638151B2

(12) United States Patent
Castaneda et al.

(10) Patent No.: US 10,638,151 B2
(45) Date of Patent: Apr. 28, 2020

(54) VIDEO ENCODING METHODS AND SYSTEMS FOR COLOR AND DEPTH DATA REPRESENTATIVE OF A VIRTUAL REALITY SCENE

(71) Applicant: Verizon Patent and Licensing Inc., Arlington, VA (US)

(72) Inventors: Oliver S. Castaneda, Jersey City, NJ (US); Nazneen Khan, Alpharetta, GA (US); Denny Breitenfeld, Florham Park, NJ (US); Dan Sun, Bridgewater, NJ (US); Vidhya Seran, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 23 days.

(21) Appl. No.: 15/994,836

(22) Filed: May 31, 2018

(65) Prior Publication Data

US 2019/0373278 A1 Dec. 5, 2019

(51) Int. Cl.
*H04N 19/513* (2014.01)
*H04N 19/139* (2014.01)
*H04N 19/186* (2014.01)
*G06T 19/00* (2011.01)
*G06T 15/08* (2011.01)
*G06T 7/50* (2017.01)
*H04N 19/172* (2014.01)

(52) U.S. Cl.
CPC ............ *H04N 19/513* (2014.11); *G06T 7/50* (2017.01); *G06T 15/08* (2013.01); *G06T 19/006* (2013.01); *H04N 19/139* (2014.11); *H04N 19/172* (2014.11); *H04N 19/186* (2014.11); *G06T 2207/10024* (2013.01)

(58) Field of Classification Search
None
See application file for complete search history.

(56) References Cited

U.S. PATENT DOCUMENTS

2006/0244836 A1\* 11/2006 Batur ................. H04N 5/23248
348/208.1
2009/0115908 A1\* 5/2009 Walls ..................... H04N 5/145
348/699

(Continued)

OTHER PUBLICATIONS

Tech et al. ("3D-HEVC Test Model 1" ITU-T Jul. 2012) (Year: 2012).\*

*Primary Examiner* — Kate H Luo

(57) ABSTRACT

An exemplary video encoding system accesses an image set that includes first and second consecutive color data images depicting a virtual reality scene from a particular vantage point, and first and second consecutive depth data images corresponding to the color data images. The system performs a first-pass video encoding of the image set by identifying motion vector data associated with a transformation from the first to the second color data image, and abstaining from analyzing a transformation from the first to the second depth data image. The system then performs a second-pass video encoding of the image set based on the identified motion vector data by encoding the first and second color data images into a color video stream to be rendered by a media player device, and the first and second depth data images into a depth video stream to be rendered by the media player device.

20 Claims, 14 Drawing Sheets

(56) References Cited

U.S. PATENT DOCUMENTS

| | | | |
|---|---|---|---|
| 2012/0033038 A1* | 2/2012 | Cho | H04N 13/128 348/43 |
| 2015/0015792 A1* | 1/2015 | Robert | G06T 7/20 348/699 |
| 2016/0029040 A1* | 1/2016 | Deng | H04N 19/176 375/240.16 |
| 2016/0182894 A1* | 6/2016 | Haimovitch-Yogev | H04N 21/21805 348/43 |
| 2017/0064279 A1* | 3/2017 | Chien | H04N 13/243 |
| 2017/0148223 A1* | 5/2017 | Holzer | G06T 3/4038 |
| 2017/0309049 A1* | 10/2017 | Law | H04N 13/275 |
| 2018/0035134 A1* | 2/2018 | Pang | H04N 19/597 |
| 2018/0192033 A1* | 7/2018 | Gallup | H04N 5/247 |

\* cited by examiner

VIDEO ENCODING METHODS AND SYSTEMS FOR COLOR AND DEPTH DATA REPRESENTATIVE OF A VIRTUAL REALITY SCENE

BACKGROUND INFORMATION

Video content is constructed from a sequence of still images that are presented in rapid succession to make objects depicted in the still images appear to move as the image sequence is presented. As such, if data representative of each pixel of each still image included within a particular image sequence were to be included in a video file or video stream without compression, the video file or stream could be extremely large and/or cumbersome (e.g., difficult to store, to transmit, to load, to play back, etc.). In some examples, the amount of uncompressed data needed to represent relatively high-quality video content (e.g., video content with a high resolution, a high frame rate, etc.) could be so large as to significantly limit the usability of the video content.

As a result, video encoding techniques have been developed to significantly reduce (i.e., compress) the amount of data used to represent video content transferred and stored by systems having limited resources (e.g., network bandwidth, data storage resources, etc.). Such video encoding techniques have been optimized for video content such as movies, web videos, live video calls, etc., and have been instrumental in enabling and promoting the popularity of such video content. However, as new forms of video content such as virtual and augmented reality gain in popularity, conventional video encoding techniques may fall short in offering easy and efficient options for encoding the new forms of video content. For example, there remains significant room for improvement in efficiently encoding video content that is not configured to be watched in a traditional way, but, rather, forms part of an overall dataset configured to be rendered to form a three-dimensional virtual scene to be experienced by users.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
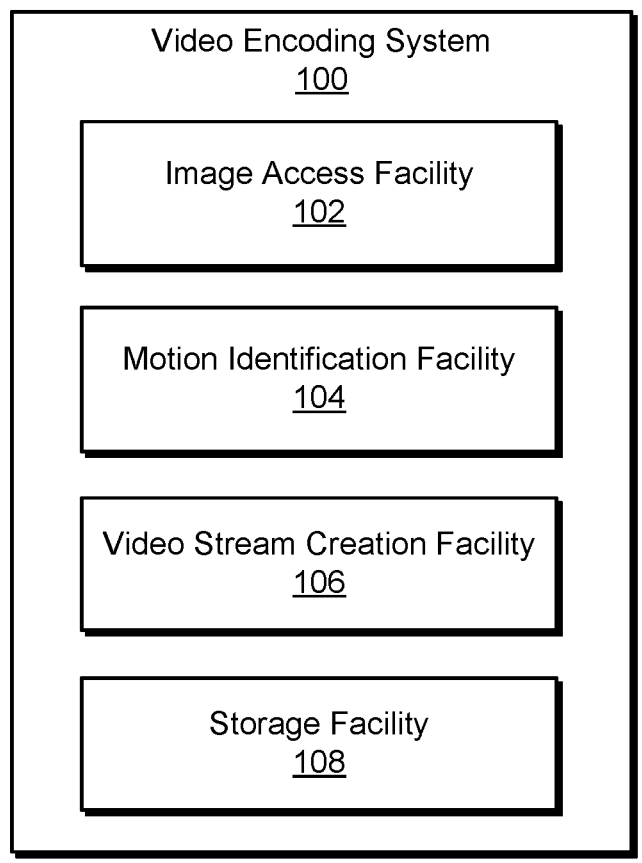
FIG. 1 illustrates an exemplary video encoding system for color and depth data representative of a virtual reality scene according to principles described herein.

Video encoding methods and systems for color and depth data representative of a virtual reality scene are described herein. For example, in certain implementations, an exemplary video encoding system may perform an exemplary video encoding method as follows. The video encoding system may access (e.g., receive, retrieve, load, transfer, etc.) an image set that includes a first and a second color data image and a first and a second depth data image. The first color data image may be included in a color data image sequence depicting a virtual reality scene from a particular vantage point, and the second color data image may consecutively follow the first color data image in the color data image sequence. Likewise, the first depth data image may be included in a depth data image sequence depicting the virtual reality scene from the particular vantage point, and the second depth data image may consecutively follow the first depth data image in the depth data image sequence. Additionally, the first depth data image may correspond to the first color data image (i.e., may be approximately synchronized so as to represent the virtual reality scene from the particular vantage point at approximately the same time), and the second depth data image may correspond to the second color data image.

Upon accessing the image set, the video encoding system may perform a first-pass video encoding of the image set. For example, the video encoding system may perform the first-pass video encoding by identifying motion vector data associated with a transformation from the first color data image to the second color data image. The video encoding system may identify the motion vector data in various ways.

For instance, in some examples, the video encoding system itself may analyze the first and second color data images and determine the motion vector data based on that analysis. In other examples, the video encoding system may access the motion vector data (or at least preliminary motion vector data that may be used as a starting point from which the motion vector data may be refined) from a separate system that has performed the analysis of the color data images or otherwise has at least preliminary information about the color data images and/or the motion vector data.

Regardless of whether the first-pass video encoding involves determining the motion vector data, accessing the motion vector data, or a combination of both (e.g., accessing preliminary motion vector data and revising the preliminary motion vector data to generate improved motion vector data), the video encoding system may further perform the first-pass video encoding of the image set by abstaining from analyzing a transformation from the first depth data image to the second depth data image. For example, motion vector data identified for the transformation from the first to the second color data image may also be used for a transformation from the first to the second depth data image, rather than separately and independently identifying (e.g., analyzing, determining, accessing from another system, etc.) the motion vector data for the depth data transformation.

Based on the motion vector data from the first pass encoding, the video encoding system may perform a second-pass video encoding of the image set. For example, the video encoding system may perform the second-pass video encoding by encoding the first and second color data images into a color video stream, and encoding the first and second depth data images into a depth video stream. While each image in each image sequence may be encoded sequentially, the encoding of corresponding color and depth images (e.g., the first color and depth images, the second color and depth images, etc.) may be performed concurrently. The color video stream and the depth video stream may be configured to be transferred to and rendered by a media player device associated with a user. For example, the media player device may present virtual reality media content to the user based on the color and depth video streams provided by the video encoding system. Specific details relating to these and other video encoding systems and methods will be described in more detail below.

Video encoding methods and systems described herein may provide various advantages and benefits. For example, by abstaining from analyzing a transformation from a first depth data image to a second depth data image during a first-pass video encoding of an image set (and instead leveraging motion vector data identified for a corresponding transformation from a first to a second color data image for this purpose), the efficiency of a video encoding system may be significantly enhanced and the processing reduced as compared to conventional video encoding systems not configured to implement such optimizations.

Additionally, further efficiency gains may be achieved by reducing other redundancies and/or implementing other optimizations. For example, as mentioned above and as will be described in more detail below, a video encoding system may identify motion vector data by accessing the motion vector data from another system that has performed the necessary analysis to determine the motion vector data, rather than reperforming the analysis and the determination independently and/or from "scratch" (i.e., without preliminary motion vector data available for use as a starting point).

By reducing redundant work and improving efficiency in these and other ways, the video encoding systems described herein may significantly improve virtual reality provider systems of which the video encoding systems are a part. For example, processing resources freed up by efficiency gains provided by the video encoding systems described herein may be employed in operations other than the relatively processing-intensive operations conventionally associated with determining motion vector data for a transformation between two images. As one example, in implementations providing real time or live virtual reality media content to users, conventional video encoding systems may only have time to run a single pass on any given dataset. Using time saved by the efficiency gains described above, however, video encoding systems described herein may be able to perform both a first and a second pass to more accurately and thoroughly compress and encode real-time and live virtual reality video data. These improvements may in turn provide a reduced impact on data networks over which the color and depth video streams are transmitted, require less processing for media player devices receiving the color and depth video streams, and generally lead to an improved user experience.

Various embodiments will now be described in more detail with reference to the figures. The disclosed methods and systems may provide one or more of the benefits mentioned above and/or various additional and/or alternative benefits that will be made apparent herein.

FIG. 1 illustrates an exemplary video encoding system 100 ("system 100") for color and depth data representative of a virtual reality scene. As shown, system 100 may include, without limitation, an image access facility 102, a motion identification facility 104, a video stream creation facility 106, and a storage facility 108 selectively and communicatively coupled to one another. It will be recognized that although facilities 102 through 108 are shown to be separate facilities in FIG. 1, facilities 102 through 108 may be combined into fewer facilities, such as into a single facility, or divided into more facilities as may serve a particular implementation. In some examples, each of facilities 102 through 108 may be distributed between multiple devices and/or multiple locations as may serve a particular implementation.

In some examples, facilities 102 through 108 may be configured to operate in real-time so as to encode and provide video data as fast as the video data is being generated and/or captured. As used herein, operations may be performed in "real time" when they are performed immediately and without undue delay such that, for example, data processing operations associated with an ongoing event (e.g., a real-world sporting event, concert, etc.) are performed while the event is still ongoing (e.g., rather than after the fact) even if there is some amount of delay such as a few seconds or minutes. In some examples, these types of real-time operations may allow virtual reality users to experience a real-world event live or at approximately the same time as people attending the event are experiencing it.

Each of facilities 102 through 108 may include or be implemented by one or more physical computing devices such as hardware and/or software components (e.g., processors, memories, communication interfaces, instructions stored in memory for execution by the processors, etc.). For instance, the facilities may be implemented using separate computing components unique to each facility, or may be implemented using shared computing components. Each of facilities 102 through 108 will now be described in more detail.

Image access facility 102 may be configured to perform various operations associated with accessing images and image sequences for encoding by system 100. For example, image access facility 102 may be configured to access an image set that includes consecutive and corresponding color and depth data images. Specifically, an exemplary image set accessed by image access facility 102 may include a first color data image included in a color data image sequence depicting a virtual reality scene from a particular vantage point, a second color data image consecutively following the first color data image in the color data image sequence, a first depth data image included in a depth data image sequence depicting the virtual reality scene from the particular vantage point, and a second depth data image consecutively following the first depth data image in the depth data image sequence. The accessed data images and image sequences may be captured synchronously with one another or may otherwise correspond one to another. For example, the first depth data image captured by image access facility 102 may correspond to the first color data image, and the second depth data image may correspond to the second color data image. In some examples, image access facility 102 may access images and/or image sequences from systems external to system 100 (e.g., by requesting and receiving the images or image sequences). In other examples, image access facility 102 may access the images and/or image sequences from other facilities included within system 100 (e.g., including facilities not explicitly shown in FIG. 1).

Motion identification facility 104 may be configured to perform various operations associated with a first-pass video encoding of image data accessed by image access facility 102. For example, motion identification facility 104 may perform a first-pass encoding of the image set including the first and second color data images and the first and second depth data images described above, as well as similar first-pass encodings for other such image sets. Motion identification facility 104 may perform a first-pass encoding of a particular image set by identifying motion vector data associated with a transformation from the first to the second color data image in the image set, while abstaining from analyzing a transformation from the first to the second depth data image in the image set, as described above. Various ways of identifying motion vector data have been mentioned above and will be described in more detail below.

Video stream creation facility 106 may be configured to perform various operations associated with a second-pass video encoding of image data that has been accessed by image access facility 102 and/or for which motion vector data has been identified by motion identification facility 104. For example, once the first-pass encoding has been performed on a particular image set as described above, video stream creation facility 106 may generate color and depth video streams to be rendered by a media player device based on the motion vector data identified by motion identification facility 104 as part of the first-pass encoding. Specifically, for instance, video stream creation facility 106 may be configured to perform the second-pass video encoding of the image set by concurrently encoding corresponding pairs of color and depth images. For example, the first and second color data images may be sequentially encoded into a color video stream to be rendered by the media player device concurrently with a sequential encoding of the first and second depth data images into a depth video stream to be rendered by the media player device. Examples of performing a second-pass encoding to create color and/or depth video streams will be described in more detail below.

Storage facility 108 may maintain any suitable data received, generated, managed, analyzed, maintained, used, and/or transmitted by facilities 102 through 106 in a particular implementation. For example, storage facility 108 may include raw (e.g., uncompressed) or encoded data representative of images, image sequences, video data, and the like. Additionally, storage facility 108 may include instructions and/or other data used by facilities 102 through 106 in performing the operations described herein.

System 100 may be implemented as a video encoding system configured to access and encode image data independently from one or more other systems that may generate and/or provide access to the data accessed by the video encoding system. In certain implementations, however, it will be understood that system 100 itself may incorporate system components and facilities (not necessarily shown in FIG. 1) that generate and provide access to the data being accessed by image access facility 102.

For example, one implementation of system 100 may include an image generation system as well as at least a first and a second video encoder communicatively coupled to the image generation system. In this way, certain efficiencies may be gained by one particular video encoder by leveraging work (e.g., motion vector data determination) performed by the other video encoder and/or by the image generation system.

For instance, as will be described and illustrated in more detail below, the image generation system included within this implementation of system 100 may be configured to generate a full atlas frame sequence including a plurality of full atlas frames. The full atlas frame sequence may include a plurality of image sequences that includes a color data image sequence and a depth data image sequence both depicting a virtual reality scene from a particular vantage point. Additionally, the color data image sequence may include a first color data image and a second color data image consecutively following the first color data image, while the depth data image sequence may include a first depth data image corresponding to the first color data image, and a second depth data image consecutively following the first depth data image and corresponding to the second color data image. The image generation system may be further configured to generate a plurality of partial atlas frame sequences each including a different subset of the image sequences in the plurality of image sequences included in the full atlas frame sequence. For example, the plurality of partial atlas frame sequences may include a first partial atlas frame sequence and a second partial atlas frame sequence that each includes the color data image sequence with the first and second color data images and the depth data image sequence with the first and second depth data images.

The first video encoder in this implementation of system 100 may be configured to access the first partial atlas frame sequence from the image generation system and perform a first-pass video encoding of the first partial atlas frame sequence. Specifically, the first video encoder may perform the first-pass video encoding by determining motion vector data associated with a transformation from the first color data image to the second color data image, and abstaining from analyzing a transformation from the first depth data image to the second depth data image. The first video encoder may further be configured to perform a second-pass video encoding of the first partial atlas frame sequence by encoding, based on the determined motion vector data, the first and second color data images into a first color video stream to be rendered by a first media player device, and the first and second depth data images into a first depth video stream to be rendered by the first media player device.

The second video encoder in this implementation of system 100 may be configured to access the second partial atlas frame sequence from the image generation system and perform a first-pass video encoding of the second partial atlas frame sequence. However, rather than performing the analysis needed to determine the motion vector data associated with the transformation from the first color data image to the second color data image itself (as the first video encoder did), the second video encoder may perform the first-pass video encoding of the second partial atlas frame sequence by accessing, from the first video encoder, the motion vector data associated with the transformation from the first color data image to the second color data image. In the same or other examples, the second video encoder may additionally or alternatively access such motion vector data from the image generation system. Like the first video encoder, the second video encoder may further be configured to abstain from analyzing the transformation from the first depth data image to the second depth data image. Additionally, the second video encoder may be configured to perform a second-pass video encoding of the second partial atlas frame sequence by encoding (e.g., based on the accessed motion vector data) the first and second color data images into a second color video stream to be rendered by a second media player device, and the first and second depth data images into a second depth video stream to be rendered by the second media player device.

Figure 2:
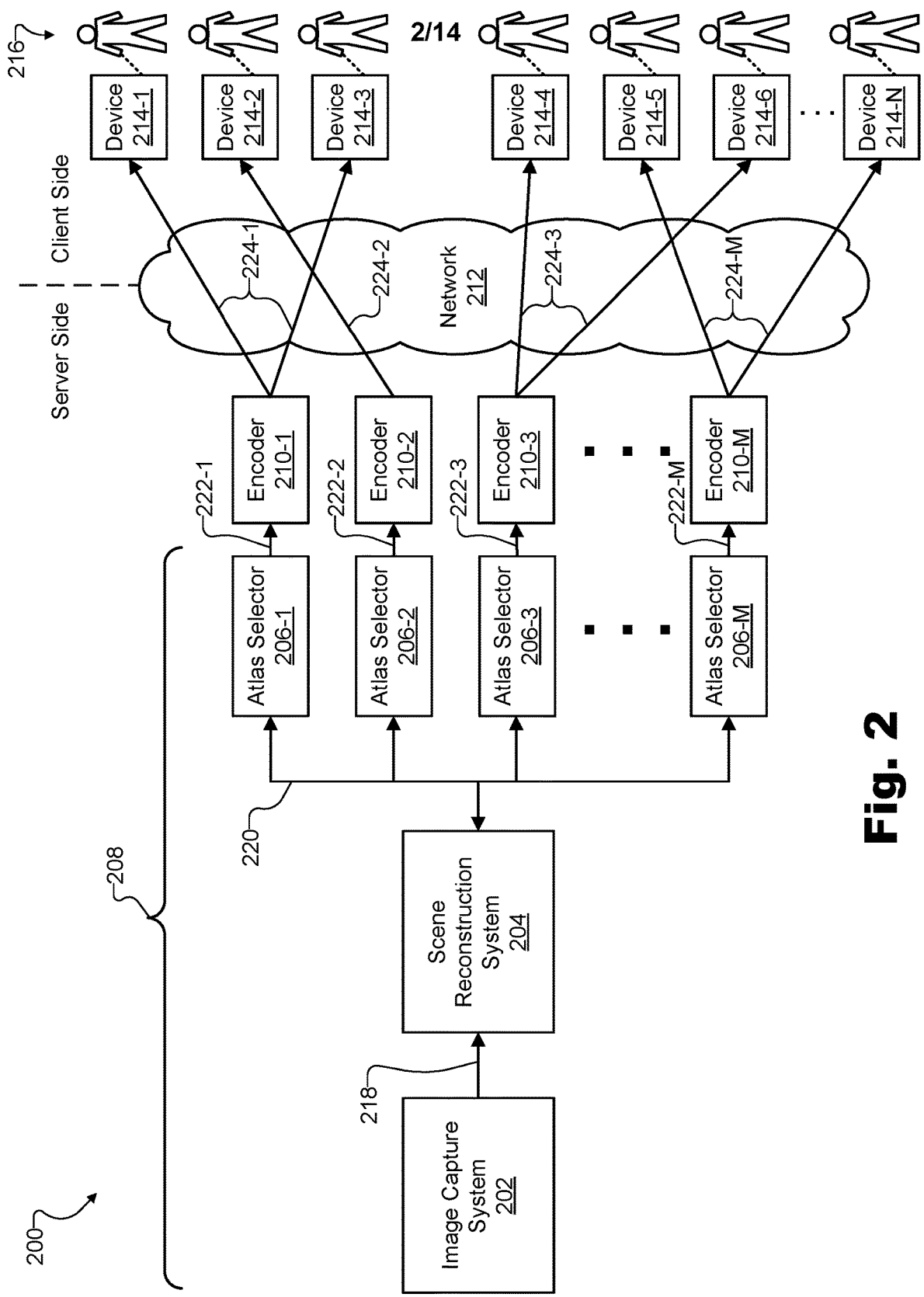
FIG. 2 illustrates an exemplary configuration in which the video encoding system of FIG. 1 may operate to perform efficient video encoding for color and depth data representative of a virtual reality scene according to principles described herein.

FIG. 2 illustrates an exemplary configuration 200 in which system 100 may operate to perform efficient video encoding for color and depth data representative of a virtual reality scene. Specifically, configuration 200 includes an image capture system 202, a scene reconstruction system 204, and a plurality of atlas selectors 206 (e.g., atlas selectors 206-1 through 206-M). As shown, image capture system 202, scene reconstruction system 204, and atlas selectors 206 may be selectively and communicatively coupled to one another.

Collectively, image capture system 202, scene reconstruction system 204, and the plurality of atlas selectors 206 may form an exemplary image generation system 208. Image generation system 208 may further be communicatively coupled with a plurality of video encoders 210 (e.g., video encoders 210-1 through 210-M) that may in turn be coupled, by way of a network 212, to a plurality of media player devices 214 (e.g., media player devices 214-1 through 214-N) associated with a plurality of users 216.

As illustrated in FIG. 2, a server-client approach may be employed in configuration 200 for virtual reality data to be generated by and provided from a server side of network 212, and to be received by and consumed on a client side of network 212. On the server side, configuration 200 illustrates a pipeline approach for generating data. Specifically, raw video data is captured by image capture system 200, and then processed and passed along by each of scene reconstruction system 204, atlas selectors 206, and video encoders 210. In some examples, additional or fewer components may be included in the pipeline than illustrated in configuration 200 and explicitly described herein. It will be understood that each of the components of the pipeline illustrated in configuration 200 may be implemented using computer hardware and software in any suitable manner. For instance, each separate box illustrated in configuration 200 may represent a different computing device (e.g., a different server computer), a different chip (e.g., processor) within a single physical computing device, a different software thread or process, or the like. Conversely, different elements may be merged and combined in any manner as may serve a particular implementation.

Each of the elements represented in configuration 200 will now be described in more detail. Various elements will be described with reference to additional illustrations, as noted.

Image capture system 202 may be configured to capture and/or generate raw image data (e.g., images, image sequences, etc.). For instance, in certain examples, a virtual reality scene may be entirely virtual (i.e., computer generated), such that the role of image capture system 202 may be to generate simulated image sequences based on computer models of virtual worlds and the like. In other examples, a virtual reality scene may be generated based on camera-captured real-world scenery. As such, image capture system 202 may include or be communicatively coupled with a plurality of capture devices (e.g., video cameras, depth imaging devices, etc.) configured to capture images for processing and distribution by image capture system 202.

Figure 3:
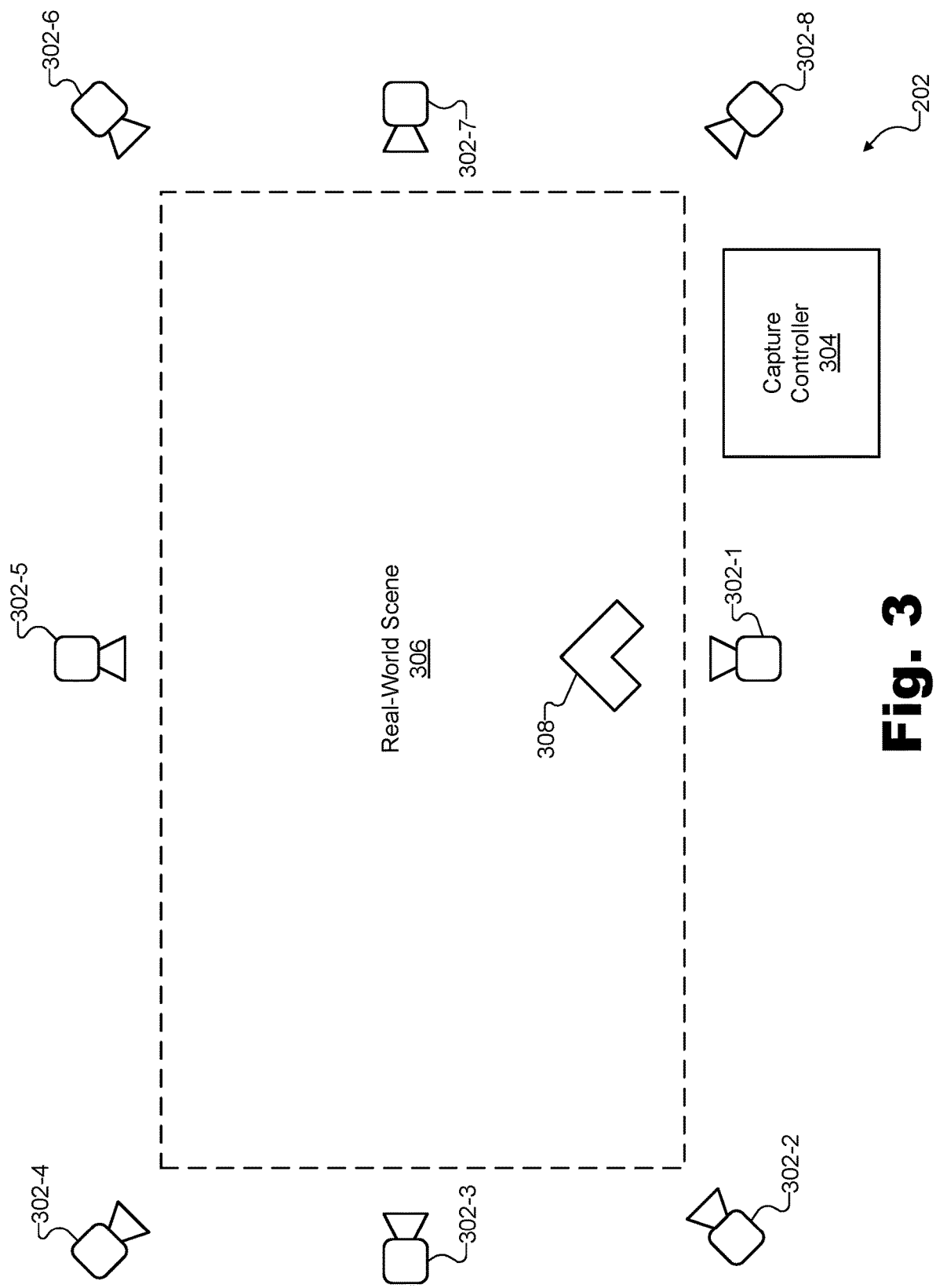
FIG. 3 illustrates an exemplary implementation of an image capture system used to capture video content representative of a real-world scene according to principles described herein.

To illustrate, FIG. 3 shows an exemplary implementation of image capture system 202 configured to capture video content representative of a real-world scene. Specifically, the implementation of image capture system 202 illustrated in FIG. 3 includes a plurality of capture devices 302 (e.g., capture devices 302-1 through 302-8) that may be selectively and communicatively coupled to one another and to a capture controller 304 (connections not explicitly shown).

Each capture device 302 may be configured to capture both color data and depth data, or may include separate devices for capturing these different types of data. As shown, capture devices 302 may be disposed at different positions around a real-world scene 306 that includes an object 308. As such, each capture device 302 may capture respective image sequences representative of real-world scene 306 and object 308 from a vantage point associated with the respective position of the capture device 302.

Capture controller 304 may receive images captured by each of capture devices 302 and may manage (e.g., buffer, aggregate, synchronize, etc.) the images to prepare image sequences that may be provided to downstream systems in the pipeline (e.g., to scene reconstruction system 204 and/or other downstream systems in the pipeline illustrated in FIG. 2).

Real-world scene 306 may represent any type of scene as may serve a particular implementation. For example, real-world scene 306 may represent any real-world indoor or outdoor location, event, landscape, structure, or the like. As illustrated by the dashed box encompassing real-world scene 306, real-world scene 306 may be a specifically delineated area such as a stage, an arena, a room, or the like. Conversely, in other examples, real-world scene 306 may not be so well defined or delineated.

Object 308 may represent any real-world object, whether living or inanimate, that is associated with (e.g., located within or around) real-world scene 306 and that is detectable (e.g., viewable, etc.) by at least one of capture devices 302. While object 308 is drawn as a relatively simple geometric shape for the sake of clarity, it will be understood that object 308 may represent various types of objects having various levels of complexity. Rather than a geometric shape, for instance, object 308 could represent any animate or inanimate object or surface, such as a person or another living thing, a non-transparent solid, liquid, or gas, a less discrete object such as a wall, a ceiling, or a floor, or any other type of object described herein or as may serve a particular implementation. As shown, object 308 may include various surfaces such that object 308 may appear different when viewed from different vantage points at which each capture device 302 is positioned.

Returning to FIG. 2, image capture system 202 is shown to provide image data 218 to scene reconstruction system 204. For example, image data 218 may include images, synchronized image sequences, metadata, and/or any other data captured and/or generated by image capture system 202. The role of scene reconstruction system 204 may then be to receive and process image data 218 to generate a full atlas frame sequence 220. For instance, scene reconstruction system 204 may be configured to generate various image sequences that together constitute full atlas frame sequence 220 by rendering (e.g., based on a volumetric model maintained by scene reconstruction system 204) each image sequence from a particular vantage point associated with each image sequence. In some examples, the volumetric model maintained by the image generation system may be constructed based on camera-captured data representative of real-world scenery. Scene reconstruction system 204 may then be configured to provide the image sequences to video encoders 210 by way of atlas selectors 206. In some implementations, video encoders may individually or collectively constitute one or more implementations of system 100.

Figure 4:
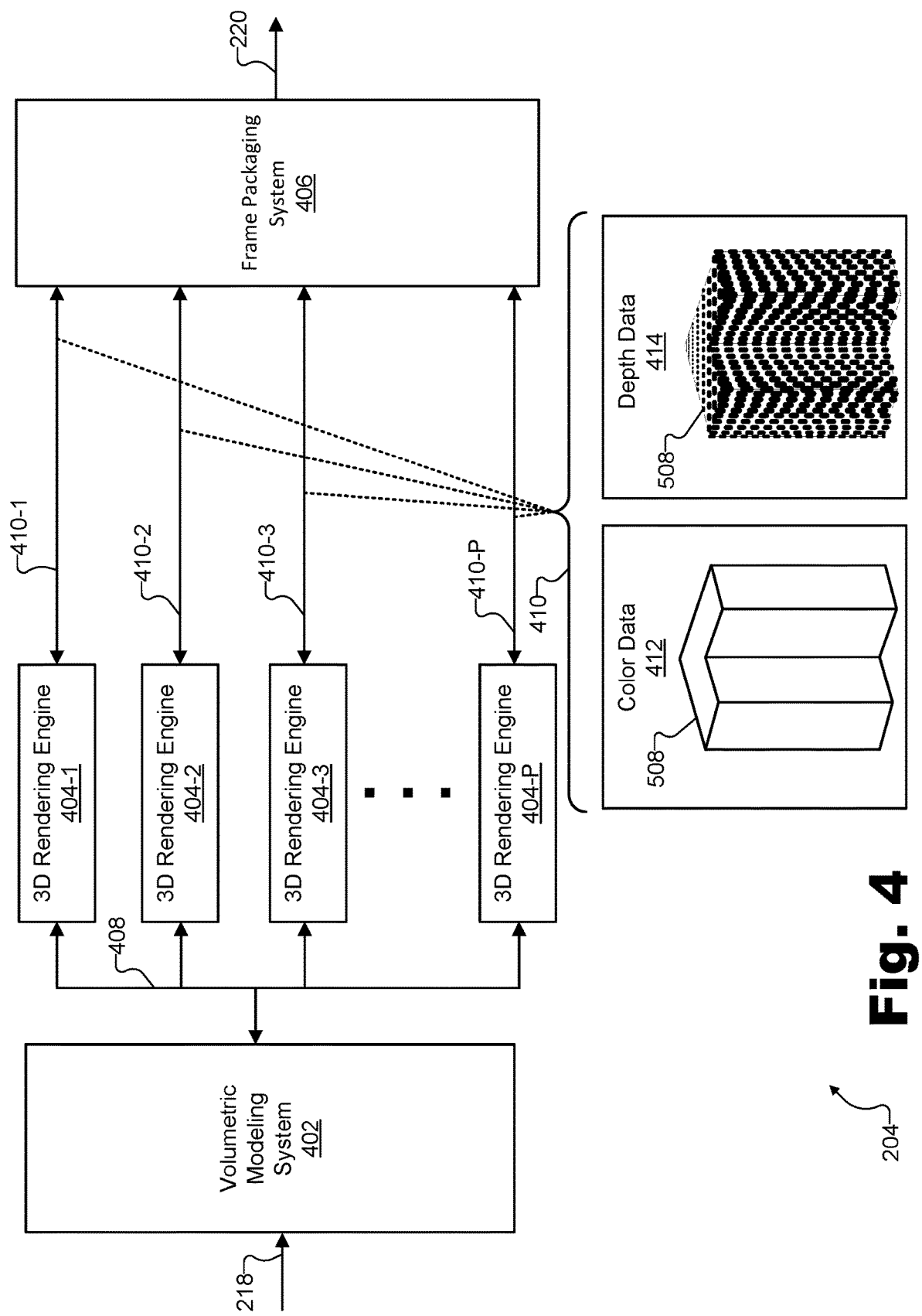
FIG. 4 illustrates an exemplary implementation of a scene reconstruction system according to principles described herein.

FIG. 4 shows an exemplary implementation of scene reconstruction system 204. For example, the implementation in FIG. 4 includes a volumetric modeling system 402, a plurality of three-dimensional ("3D") rendering engines 404 (e.g., 3D rendering engines 404-1 through 404-P), and a frame packaging system 406.

Volumetric modeling system 402 may receive image data 218 from image capture system 202, and may be configured to manage a volumetric model representative of real-world scene 306 and objects included therein (e.g., object 308) based on image data 218. In some examples, the volumetric model managed by volumetric modeling system 402 may be dynamically changing (e.g., by behavior of the objects included within the volumetric model, by interactions with users experiencing a virtual reality world associated with the volumetric model, etc.). As such, volumetric modeling system 402 may track the current state of the volumetric model in light of the dynamic changes.

Volumetric modeling system 402 may generate volumetric model description data 408 representative of the state of the volumetric model being managed and tracked by volumetric modeling system 402. For example, volumetric model description data 408 may take the form of a plurality of volumetric model description frames (e.g., key description frames, update description frames, etc.) that may each be provided to each of 3D rendering engines 404.

Volumetric model data 408 may provide all the information needed by 3D rendering engines 404 to render the volumetric model from different vantage points associated with the different 3D rendering engines. In other words, volumetric model data 408 may provide sufficient data for 3D rendering engines 404 to generate virtual renderings of real-world scene 306 as the scene is represented by the volumetric model managed by volumetric modeling system 402. In some examples, volumetric model data 408 may include state information representative of the volumetric model along with links to detailed information (e.g., binary data representative of virtual object geometries, textures, etc.) that is stored in an asset storage system (not explicitly shown) and that may be accessed by 3D rendering engines 404 based on the links in the volumetric model data provided.

Each 3D rendering engine 404 may be associated with a different vantage point of the volumetric model managed by volumetric modeling system 402 (e.g., a different vantage point of real-world scene 306). As used herein, a "vantage point" from which an image sequence (e.g., a color data image sequence or a depth data image sequence) is captured, depicted, represented, or the like, may define various aspects of how the image sequence and the images included therein are captured, depicted, represented, and so forth. For example, the vantage point may define whether an image sequence is taken from a perspective of a particular point in space (and, if so, where that point in space is, what direction or orientation from that point in space the image sequence represents, etc.) or whether the image sequence is taken orthographically.

An orthographic vantage point may refer to a vantage point from which a rendering or other projection of color data and/or depth data may be generated orthogonally. In other words, this may refer to a projection in which 3D surfaces of 3D objects are projected onto a two-dimensional projection plane by means of a parallel projection in which projection lines are all orthogonal to the projection plane. Orthographic vantage points may contrast with other vantage points described herein such as perspective vantage points. Specifically, perspective vantage points provide projections or renderings depicting objects as the objects actually appear from a particular perspective by using projection lines that all originate and extend from a certain point (e.g., a perspective vantage point) to the surfaces of objects. In contrast, orthographic vantage points provide projections depicting objects differently than the objects actually appear from any given point in space by using parallel projection lines all orthogonal to a projection plane (i.e., rather than extending from a common point).

Orthographic projections obtained using orthographic vantage points may be beneficial in various implementations for a variety of reasons. For example, as compared to perspective projections, orthographic projections may have reduced overlap and, thus, reduced data redundancy. Additionally, orthographic projections may facilitate a uniform segmentation of a virtual reality scene into rectangular cells, whereas frustum bounds associated with perspective projections may make perspective projections more complicated and/or difficult to align. Additionally, fewer orthographic projections may be used to uniformly sample a rectangular volume as compared to a number of perspective projections used to uniformly sample the same volume.

Vantage points, as used herein, may also further define other aspects of how image sequences and/or images are captured, depicted, and represented. For example, a vantage point may define a particular resolution used to capture and represent an image, a field of view or zoom factor with which an image is captured and/or represented, and so forth. As a result, it will be understood that, as used herein, corresponding color and depth data image sequences that are depicted from the same vantage point may depict substantially identical subject matter, albeit using different types of data (i.e., color data versus depth data).

Figure 5:
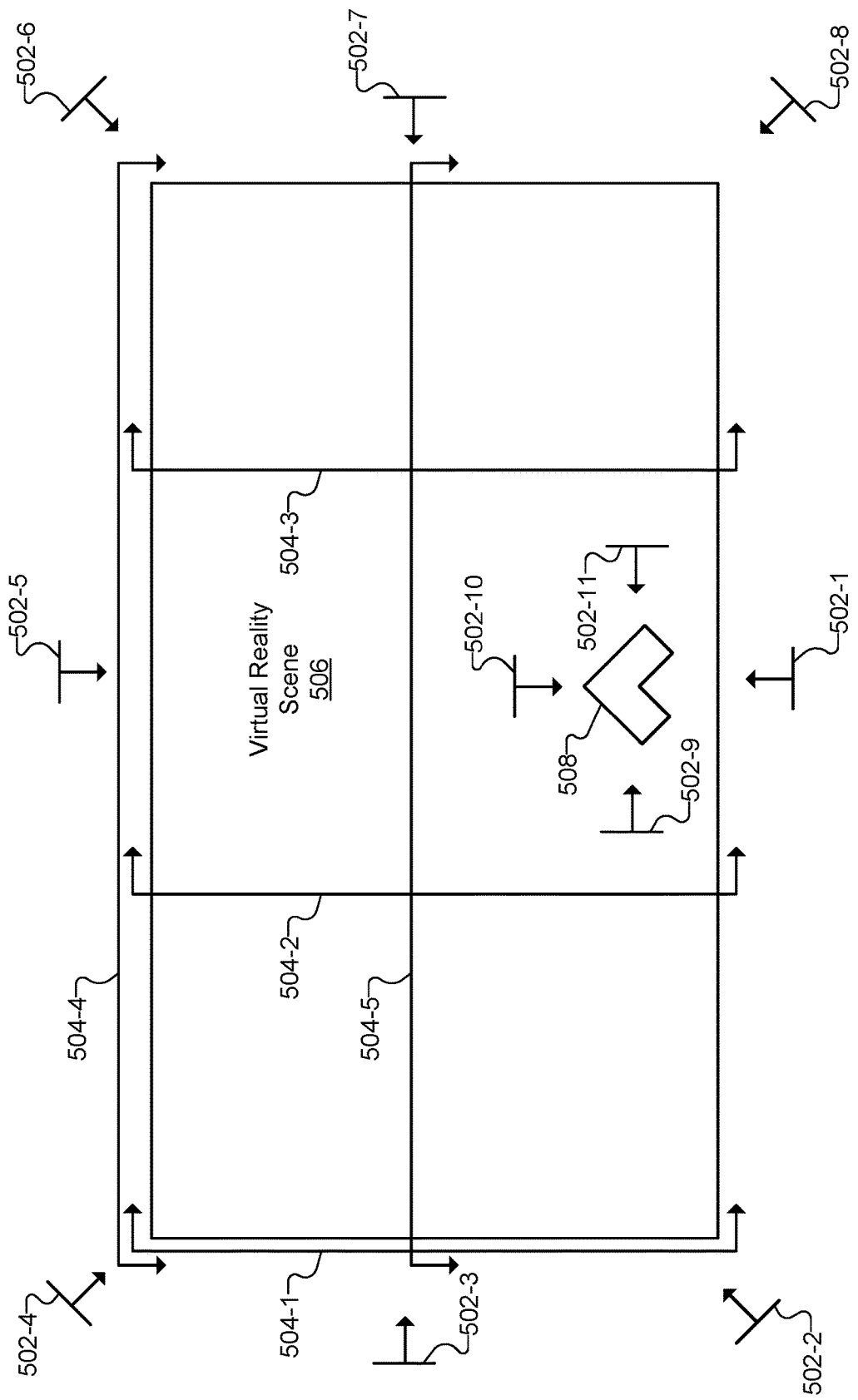
FIG. 5 illustrates an exemplary virtual reality scene and various exemplary vantage points from which the virtual reality scene may be depicted according to principles described herein.

To illustrate exemplary vantage points, FIG. 5 shows an exemplary virtual reality scene and various exemplary vantage points from which the virtual reality scene may be depicted. Specifically, FIG. 5 illustrates a plurality of perspective vantage points 502 (e.g., vantage points 502-1 through 502-11) and a plurality of orthographic vantage points 504 (e.g., vantage points 504-1 through 504-5) from which images and/or image sequences of a virtual reality scene 506 that includes a virtual object 508 may be depicted. In FIG. 5, virtual reality scene 506 may correspond to real-world scene 306, described above, while virtual object 508 may correspond to object 308. In other words, virtual reality scene 506 may be understood to include a virtual representation of real-world scene 306 in which virtual object 508 is a virtual representation of real-world object 308.

As shown, each perspective vantage point 502 may be represented in FIG. 5 with an arrow symbol disposed at a particular location with respect to virtual reality scene 506 (i.e., a location from which the vantage point provides a perspective) and pointing in a general direction representative of the orientation of the vantage point (i.e., the general direction of the field of view associated with the vantage point). Conversely, orthographic vantage points 504 are represented in FIG. 5 as longer lines having arrows at either side to suggest the non-perspective, orthographic nature of these vantage points.

The positions associated with vantage points 502 and/or 504 may be fixed with respect to virtual reality scene 506 in some examples, and may be moving in various ways (e.g., rotating, sliding, panning, instantaneously hopping, etc.) in other examples. In addition to movements and reorientations of vantage points 502 and 504, other aspects of vantage points 502 and 504 may also change over the course of an image sequence. For example, a zoom factor may be increased or decreased for a particular vantage point, a field of view may be altered, a frame rate or resolution may be adjusted, and so forth. As will be described in more detail below, scene reconstruction system 204 may manage and direct all such changes to vantage points 502 and 504, and, in certain examples, may thus provide data representative of these vantage point changes to implementations of system 100 (e.g., to one or more of video encoders 210) to facilitate efficient encoding of the image sequences into video streams.

As shown, each of perspective vantage points 502-1 through 502-8 may correspond to a position of a respective capture device 302. Specifically, perspective vantage point 502-1 may correspond to a position of capture device 302-1, perspective vantage point 502-2 may correspond to a position of capture device 302-2, and so forth. As such, the fixed positions at which vantage points 502 are disposed in this example are shown to surround virtual reality scene 506 along at least two dimensions associated with virtual reality scene 506 (e.g., along a plane such as the ground). In some examples, vantage points 502 may further surround virtual reality scene 506 along three dimensions (e.g., by including vantage points 502 above and below virtual reality scene 506 as well). Even in examples where vantage points 502 surround virtual reality scene 506 along only two dimensions, pluralities of vantage points 502 may be "stacked" at different heights relative to the positions encircling virtual reality scene 506 shown in FIG. 5 in order to view virtual object 508 (and other virtual objects that may be included within virtual reality scene 506) from related but slightly different perspectives.

Unlike vantage points 502-1 through 502-8, perspective vantage points 502-9 through 502-11 may not correspond to any physical capture devices used to capture real-world scene 306. Rather, vantage points 502-9 through 502-11 may represent virtual capture devices configured to provide better views of certain parts of virtual reality scene 506 (e.g., the immediate vicinity of virtual object 508). Image sequences depicted from vantage points 502-9 through 502-11 may be generated based on data captured by capture devices 302 just as image sequences depicted from vantage points 502-1 through 502-8. However, because vantage points 502-9 through 502-11 do not correspond to positions of physical capture devices, data captured by one or more physical capture devices may be transformed, combined, and/or otherwise processed to generate image sequences depicted from vantage points 502-9 through 502-11.

Likewise, image sequences depicted from orthographic vantage points 504 may be generated by transforming, combining, and/or otherwise processing image sequences captured by physical capture devices 302. In some examples, orthographic vantage points 504 may be disposed with respect to virtual reality scene 506 so as to generate image sequences associated with orthographic slices of virtual reality scene 506. As used herein, an "orthographic slice" may refer to an orthographic projection of color data, depth data, or a combination of both color and depth data for surfaces within a particular sub-volume (e.g., a relatively thin, "slice"-shaped rectangular prism or another suitably shaped sub-volume) of the entire volume of virtual reality scene.

Returning to FIG. 4, each of the vantage points illustrated and described in relation to FIG. 5 may be associated with a different 3D rendering engine 404. For example, each 3D rendering engine 404 may be configured to render at least one image sequence 410 (e.g., image sequences 410-1 through 410-P) depicting real-world scene 506 from a different one of vantage points 502 or 504. It will be understood that each image sequence 410 illustrated in FIG. 4 may be a color data image sequence, a depth data image sequence, or a combination of both (e.g., a combination of a color data image sequence and a corresponding depth data image sequence, collectively referred to herein as a "surface data image sequence"). In some examples, image sequences 410 may further include metadata or other information as may serve a particular implementation.

To illustrate exemplary color and depth data images that may be included within image sequences 410, FIG. 4 depicts an exemplary color data image 412 and an exemplary depth data image 414. For example, color data image 412 and depth data image 414 may both represent object 308 from perspective vantage point 502-1 (i.e., the vantage point associated with the position of capture device 302-1).

As used herein, "color data" may broadly include any image data, video data, or the like, whether represented in color or grayscale (i.e., "black and white"), that represents how a subject (e.g., an object included within a virtual reality scene) may appear at a particular point in a temporal sequence or over a particular time period from the vantage point. Color data is not limited to any particular format, file type, frame rate, resolution, quality level, or other characteristic that may be associated with various definitions and/or standards defining image data and/or video data in the art. As such, color data image 412 may be captured, formatted, transmitted, and represented in any suitable form. For example, color data image 412 may be represented by digital data that is formatted according to a standard image format.

Similarly, as used herein, "depth data" may include any data representative of a position of a subject in space. For example, depth data representative of an object may represent coordinates with respect to a coordinate system (e.g., a global coordinate system associated with the virtual reality scene) for different points on the surfaces of the object. As such, depth data image 414 may depict another view of the volumetric model managed by the volumetric modeling system (e.g., another view of real-world scene 306) from the same vantage point associated with color data 412. However, rather than depicting the visible appearance of virtual object 508 (i.e., representing in color or grayscale how light interacts with the surfaces of virtual object 508), depth data image 414 may depict the depth (i.e., the distance or position) of each point on the surface of virtual object 508 with respect to the vantage point.

As with color data image 412, depth data image 414 may be captured, formatted, transmitted, and represented in any suitable form. For example, as shown, depth data image 414 may be depicted using grayscale image data (e.g., six or eight bits for each pixel included within depth data image 414). However, rather than representing how visible light reflects from the surfaces of virtual object 508 (i.e., as represented in color data image 412), the grayscale image of depth data image 414 may depict, for each pixel in the image, how far away the point represented by that pixel is from the vantage point. For example, points that are closer to the vantage point may be represented with values that represent darker shades of gray (e.g., binary values closer to 0b111111 in the case of a six-bit implementation where 0b111111 represents black). Conversely, points that are farther away from the vantage point may be represented with values that represent lighter shades of gray (e.g., binary values closer to 0b000000 in the case of the six-bit implementation where 0b000000 represents white).

Respective image frame sequences 410 (e.g., sequences including images such as such as color data image 412 and depth data image 414) may be generated by 3D rendering engines 404. As shown in FIG. 2, each image frame sequence 410 may then be provided to frame packaging system 406, which may organize, synchronize, combine, and/or otherwise process the surface data frames to generate a full atlas frame sequence 220.

Figure 6:
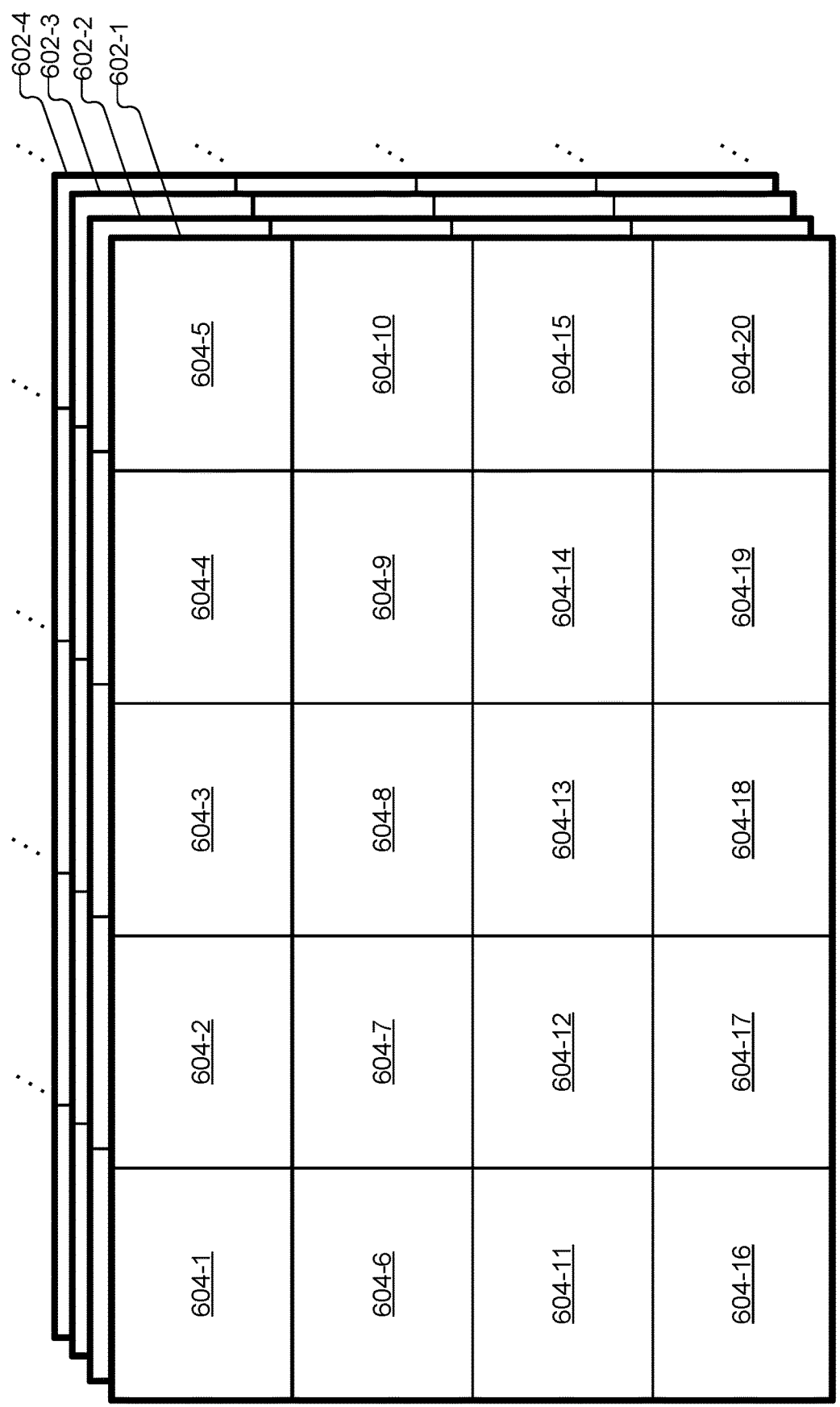
FIG. 6 illustrates an exemplary full atlas frame sequence including a plurality of full atlas frames according to principles described herein.

To illustrate, FIG. 6 shows an exemplary representation of full atlas frame sequence 220 including a plurality of full atlas frames 602 (e.g., full atlas frames 602-1 through 602-4 and additional frames not shown). In FIG. 6, each full atlas frame 602 in full atlas frame sequence 220 is shown to include a plurality of images 604 (e.g., images 604-1 through 604-20). For example, images 604 may include various color data images depicted from various vantage points 502 and/or 504, various depth data images depicted from the same or additional vantage points 502 and/or 504, and/or a combination of both color data images and depth data images.

Atlas frames (e.g., also referred to as texture atlases) may combine a plurality of images (e.g., also referred to as atlas tiles, patches, sprites, etc.) that have certain attributes in common (e.g., each is representative of the same virtual reality scene, each is to be transmitted to the same destination, etc.) for convenience and efficiency in transmitting, storing, and processing the images. In the example of FIG. 6, each image 604 is shown to be a uniform size and to be partitioned into unique rectangular areas. However, it will be understood that, in certain examples, atlas tiles may take irregular shapes and may be combined together in a manner that is less regular and/or partitioned than the example of FIG. 6 (e.g., such that images are pushed together to maximize image space on each frame).

Each image 604 on each full atlas frame 602 may be part of a different image sequence consisting of the image 604 and corresponding images on other full atlas frames 602 in full atlas frame sequence 220. For example, image 604-1 may be part of an image sequence consisting of image 604-1 on full atlas frame 602-1, a corresponding image included on full atlas frame 602-2, a corresponding image included on full atlas frame 602-3, and so forth. Accordingly, just as each full atlas frame 602 includes, in this example, twenty different images 604, it will be understood that full atlas frame sequence 220 includes twenty different image sequences. For example, among the image sequences included in full atlas frame sequence 220 may be a particular color data image sequence and a particular depth data image sequence.

Figure 7:
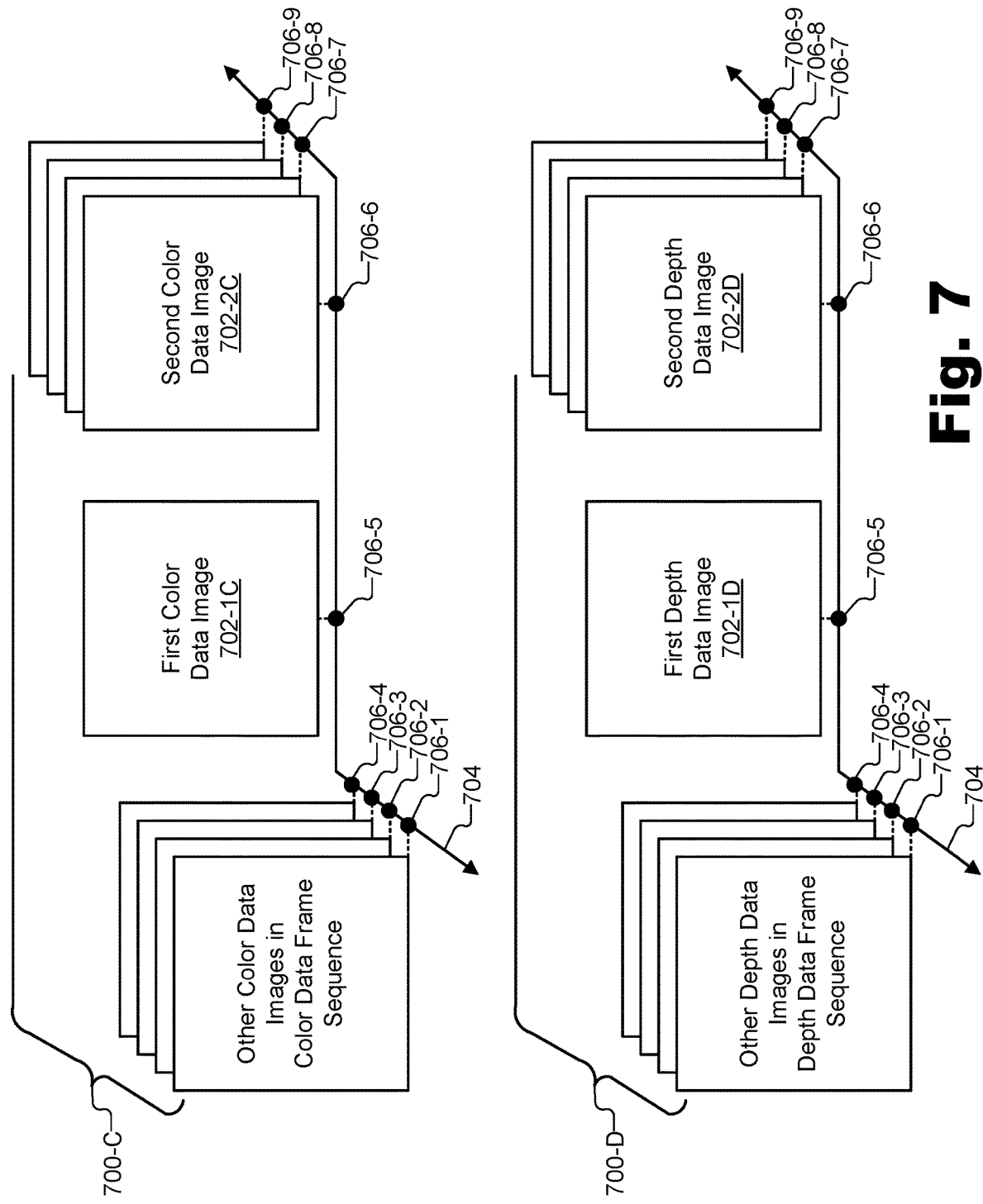
FIG. 7 illustrates an exemplary image set including color and depth data images included, respectively, in corresponding color and depth data image sequences according to principles described herein.

To illustrate, FIG. 7 shows an exemplary color data image sequence 700-C and a corresponding depth data image sequence 700-D that may both be included within full atlas frame sequence 220. For instance, color data image sequence 700-C may represent the image sequence that includes image 604-1 while depth data image sequence 700-D may represent the image sequence that includes image 604-2.

As shown in FIG. 7, color data image sequence 700-C and depth data image sequence 700-D collectively include an exemplary image set such as other image sets described herein. Specifically, among the various images included in the two image sequences, an image set is included that comprises a first color data image 702-1C, a second color data image 702-2C, a first depth data image 702-1D, and a second depth data image 702-2D. Collectively, the color and depth data images included in the image set of FIG. 7 may be referred to herein as images 702, and the image set may be similarly referred to herein as image set 702.

As illustrated in FIG. 7, all of the images in image sequences 700-C and 700-D are displayed along a common timeline 704. Times 706 (e.g., times 706-1 through 706-9) are illustrated on timeline 704 to show how each color data image and depth data image in images sequences 700-C and 700-D correspond to (e.g., are synchronized with) an image in the opposite image sequence. For example, as shown, color data image 702-1C corresponds to depth data image 702-1D because both images 702 are associated with time 706-5. Similarly, color data image 702-2C is shown to correspond to depth data image 702-2D since both images 702 are associated with time 706-6.

The illustration of image sequences FIG. 7 also shows that the color data images and depth data images in image set 702 are consecutive images (i.e., one follows after the other) within their respective image sequences. As such, it will be understood that color data image 702-1C and depth data image 702-1D may each depict (using different types of data) the same subject matter from the same vantage point, while color data image 702-2C and depth data image 702-2D also depict the same subject matter as one another from the same vantage point. The vantage point and/or the subject matter being depicted (e.g., objects within a virtual reality scene) may, however, change slightly between the images associated with time 706-5 (i.e., images 702-1C and 702-1D) and the images associated with time 706-6 (i.e., images 702-2C and 702-2D). Because these changes may be relatively slight, the changes may be represented more efficiently than accounting for values associated with each and every pixel of both images. Determining an efficient way to represent these changes may be performed as part of a compression and encoding process performed by system 100, as will be described in more detail below.

In some examples, an atlas frame sequence may be configured to include all of the color data image sequences and all of the depth data image sequences associated with all of the vantage points that may be available for a particular virtual reality scene. For instance, full atlas frame sequence 220 may be understood to be an example of such an atlas frame sequence for this example, which is why it is referred to as a "full" atlas frame sequence. Referring back to FIG. 2, configuration 200 illustrates that scene reconstruction system 204 may be configured to generate such a full atlas frame sequence to distribute the available image sequences to various encoders 210 and, eventually, to various media player devices 214. However, in examples where many frame sequences from many vantage points may be available for rendering a particular virtual reality scene, it may not be desirable for each encoder 210 or each media player device 214 to receive all of the possible image sequences. For instance, if a user 216 desires to experience virtual reality scene 506 near the vicinity of virtual object 508, his or her media player device 214 may be able to make use of a relatively large amount of detail from vantage points such as vantage points 502-1, 502-9, 502-10, 502-11, and/or other vantage points in the vicinity. However, the media player device 214 used by this user 216 may not have use for large amounts of detail of other parts of virtual reality scene 506 and, as a result, it may not be necessary or desirable to provide this media player device 214 with data representing virtual reality scene 506 as depicted from other vantage points.

To this end, atlas selectors 206-1 may be employed within image generation system 208 to receive full atlas frame sequence 220 and to select particular combination subsets of image sequences from full atlas frame sequence 220 that may be desirable to send different media player devices 214, which each may be providing virtual reality experiences in different parts of virtual reality scene 506. As shown in FIG. 2, such subsets of image sequences may be included in a plurality of different partial atlas frame sequences 222 (e.g., partial atlas frame sequences 222-1 through 222-M), and may be supplied to each of video encoders 210-1 through 210-M with a set of image sequences to encode and provide to whichever media player devices 214 may request them. For example, the plurality of partial atlas frame sequences 222 may each include a different subset of the image sequences in the plurality of image sequences included in full atlas frame sequence 220.

Figure 8:
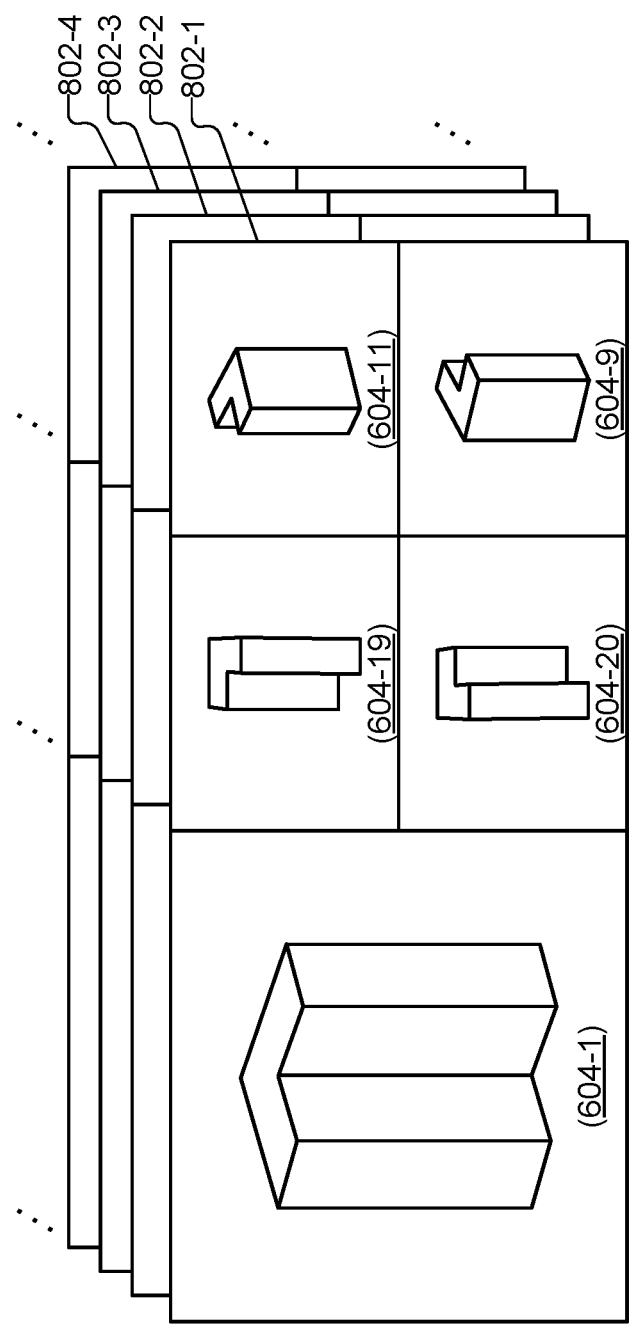
FIG. 8 illustrates an exemplary partial atlas frame sequence including a subset of image sequences included in the full atlas frame sequence of FIG. 6 according to principles described herein.

FIG. 8 shows an exemplary partial atlas frame sequence 222 including a subset of image sequences selected from full atlas frame sequence 220. Partial atlas frame sequence 222 may represent any of partial atlas frame sequences 222-1 through 222-M shown in configuration 200. As shown, partial atlas frame sequence 222 includes a plurality of partial atlas frames 802 (e.g., partial atlas frames 802-1 through 802-4 and additional frames not explicitly shown), each of which contains a subset of images 604 from full atlas frames 602 in FIG. 6. For example, as illustrated on partial atlas frame 802-1, a full-sized version of image 604-1 is included along with reduced-sized versions of images 604-9, 604-11, 604-19, and 604-20. Specifically, these images (and their associated image sequences formed by corresponding images on the other partial atlas frames 802) may provide desirable detail for a user experiencing virtual reality scene 506 in the vicinity of virtual object 508 (e.g., near vantage point 502-1). It will be understood that the images 604 illustrated in FIG. 8 are exemplary only, and that additional images (e.g., including both color data images and depth data images) may be included on certain partial atlas frame implementations.

Returning to FIG. 2, configuration 200 illustrates that each partial atlas frame sequence 222 may be associated with (e.g., may feed into) a different video encoder 210. In other words, each video encoder 210 may access a particular partial atlas frame sequence 222. While each partial atlas frame sequence 222 may be unique (i.e., such that none contain an identical combination of image sequences as contained by any other partial atlas frame sequence 222), it will be understood that certain image sequences may be included in multiple or all of the combinations included the different partial atlas frame sequences 222. For instance, at least two partial atlas frame sequences 222 may include both color data image sequence 700-C and depth data image sequence 700-D.

Accordingly, there are a variety of ways that each video encoder 210 may be configured to optimize encoding operations as compared to a conventional encoder that is configured to independently encode each image sequence included on the provided partial atlas frame sequence 222 without any optimization.

As a first exemplary optimization, a video encoder 210 may be configured to identify motion vector data for color data image sequence 700-C and depth data image sequence 700-D by analyzing the transformation from color data image 702-1C to color data image 702-2C, and then determining the motion vector data based on the analyzing of the transformation from color data image 702-1C to color data image 702-2C. In other words, the determination of motion vector data for depth data images 702-1D and 702-2D may be performed by reusing the motion vector data determined for color data images 702-1C and 702-2C, rather than by analyzing a transformation from depth data image 702-1D to depth data image 702-2D. Indeed, as mentioned above, by reusing the motion vector data derived from color data images 702-1C and 702-2C, the video encoder 210 may abstain from analyzing the transformation from depth data image 702-1D to depth data image 702-2D altogether, thereby improving the efficiency of that video encoder 210 and freeing up resources of that video encoder 210 to perform other tasks (e.g., to perform a second pass encoding on the motion vector data derived from the color data images).

In this first example, the video encoder 210 still may be responsible for performing an initial analysis of a transformation between images (i.e., color data images 702-1C and 702-2C) and, based on that initial analysis, determining motion vector data representative of both the transformation between color data images 702-1C and 702-2C, and the transformation between depth data images 702-1D and 702-2D. As mentioned above, this may represent a significant optimization over conventional examples that perform an analysis of the transformation between color data images to determine motion vector data representative of the transformation between color data images, as well as separately performing an analysis of a transformation between depth data images to determine motion vector data representative of the transformation between the depth data images.

In addition to efficiency gains obtained by leveraging the same motion vector data for the transformations between both the color data images and the depth data images, this first optimization may also result in an increase in quality (e.g., accuracy, etc.) for the motion vector data determined for the transformation between the depth data images. This is because video encoding technology used to implement the video encoder 210 may be optimized to analyze color data images, rather than depth data images. For example, the video encoding technology may be well-suited to calculate motion based on matching color data between color data images, but identifying matching grayscale depth data to calculate motion in an analogous matter for depth data images may be considerably more difficult and/or may tend to be considerably less accurate. Thus, motion vector data may be of suboptimal quality when determined in conventional ways by analyzing depth data directly, and may be significantly improved by the video encoding methods and systems described herein by leveraging a color data analysis to calculate depth-based motion vector data.

As a second exemplary optimization, a video encoder 210 may access image set 702 from image generation system 208, and may identify motion vector data for color data image sequence 700-C and depth data image sequence 700-D by accessing (e.g., from image generation system 208 along with image set 702) preliminary motion vector data associated with the transformation from color data image 702-1C to color data image 702-2C. In this example, the video encoder 210 may then refine the preliminary motion vector data accessed from image generation system 208 to determine motion vector data for both image sequences 700-C and 700-D. In other words, in this example, the video encoder 210 may not only gain efficiency by leveraging data specifically determined for color data image sequence 700-C for calculating motion vector data for both image sequences 700-C and 700-D, but may gain further efficiency by also leveraging preliminary motion vector data known to image generation system 208 (i.e., rather than analyzing the transformation between color data images 702-1C and 702-2C from scratch to determine such data).

As a third exemplary optimization, a video encoder 210 such as video encoder 210-1 may similarly access image set 702 from image generation system 208, which, as mentioned above, may provide image set 702 to both the video encoder 210 (e.g., encoder 210-1) as well as to an additional video encoder 210 (e.g., video encoder 210-2). In this example, the additional video encoder 210 (e.g., video encoder 210-2) may be configured to analyze the transformation from color data image 702-1C to color data image 702-2C, and to determine preliminary motion vector data associated with the transformation from color data image 702-1C to 702-2C based on that analysis. As a result, another encoder that accesses the same image set 702 (e.g., video encoder 210-1) may identify motion vector data for color data image sequence 700-C and depth data image sequence 700-D by accessing (e.g., from additional video encoder 210-2) the preliminary motion vector data associated with the transformation from color data image 702-1C to 702-2C, and refining the preliminary motion vector data accessed from the additional encoder to determine the motion vector data. In other words, in this example, one encoder 210 such as encoder 210-1 may not only gain efficiency by leveraging data specifically determined for color data image sequence 700-C for determining motion vector data for both image sequences 700-C and 700-D, but may gain further efficiency by also leveraging preliminary motion vector data determined by an additional video encoder (e.g., video encoder 210-2) that also accesses the same image sequences (i.e., image sequences 700-C and 700-D).

Figure 9:
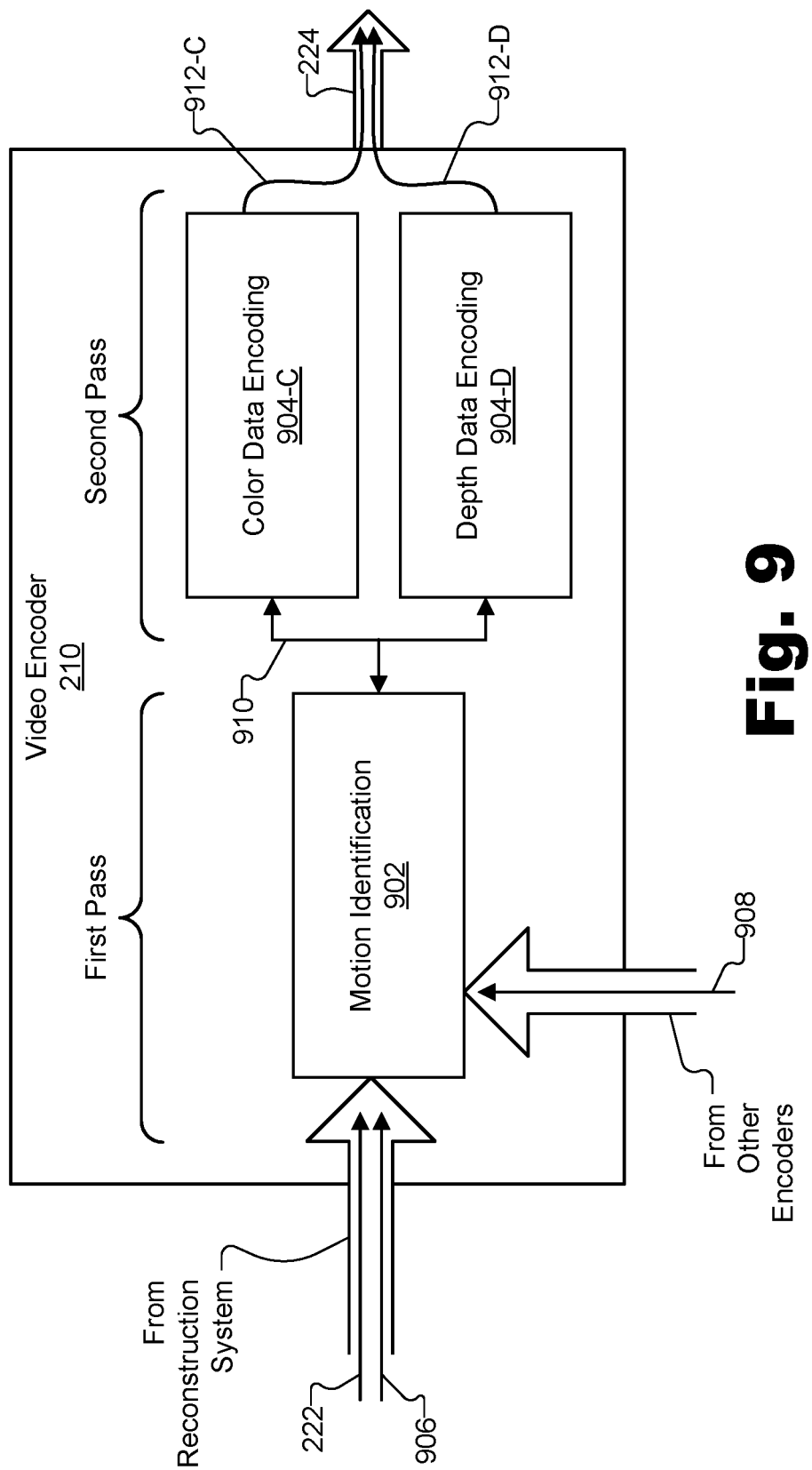
FIG. 9 illustrates an exemplary video encoder for performing efficient encoding of color and depth data representative of a virtual reality scene according to principles described herein.

To illustrate these possible optimizations in the context of a particular video encoder 210, FIG. 9 shows an exemplary video encoder 210 for performing efficient encoding of color and depth data representative of a virtual reality scene. Video encoder 210 shown in FIG. 9 will be understood to be an implementation of any of encoders 210 illustrated in FIG. 2 and described above, and may perform efficient encoding of color and depth data using any or all of the optimizations described herein and/or any combinations thereof.

In FIG. 9, video encoder 210 is shown to include a motion identification block 902 configured to perform a first pass encoding by identifying motion vector data for image sequences included on a partial atlas frame sequence 222 accessed by video encoder 210. Video encoder 210 is further shown to include two encoding blocks 904 (i.e., color data encoding block 904-C and depth data encoding block 904-D) configured to perform a second pass encoding by encoding, respectively, color data images into a color video stream to be rendered by a media player device and depth data image into a depth video stream to be rendered by the media player device.

Motion identification block 902 may perform the first pass encoding of image sequences included in partial atlas frame sequence 222 in any of the ways described herein. For example, motion identification block 902 may receive a particular image sequence on partial atlas frame sequence 222 and may itself perform an analysis on the image sequence to determine motion vector data associated with the image sequence. Additionally or alternatively, motion identification block 902 may receive, along with partial atlas frame sequence 222, either or both of preliminary motion vector data 906 and preliminary motion vector data 908. For example, as described above, preliminary motion vector data 906 may be provided by reconstruction system 208, which may manage the vantage points from which each image sequence included within partial atlas frame sequence 222 is depicted, and which may therefore be able to provide data describing how the vantage points may be changing from image to image (e.g., if the vantage points are zooming, panning, rotating, etc.).

As another example, preliminary motion vector data 908 may be provided by another video encoder 210 that receives a partial atlas frame sequence 222 that includes the same or related image sequences to be processed by motion identification block 902. For example, if motion identification block 902 receives color data image sequence 700-C and depth data image sequence 700-D, other video encoders that also receive these image sequences may provide preliminary motion vector data 908 after analyzing the image sequences to determine the motion vector data for the image sequences. In the same manner, video encoder 210 may, in certain examples, be configured to share motion vector data for image sequences that has been determined based on an analysis by video encoder 210 with the other video encoders to increase their efficiency.

In some examples, preliminary motion vector data 906 and/or 908 may be configured to serve, without modification, as motion vector data 910 provided by motion identification block 902 to encoding blocks 904. In other words, it will be understood that "preliminary motion vector data," as used herein, may be "preliminary" to video encoder 210 only in the sense that the motion vector data has been previously determined (i.e., analyzed, computed, calculated, etc.) elsewhere, and thus does not need to be determined by video encoder 210. As such, in certain examples, preliminary motion vector data 906 and/or 908 may be determined elsewhere (i.e., somewhere other than within video encoder 210), but may serve as final motion vector data for video encoder 210. Accordingly, in these examples, motion identification block 902 may identify motion vector data 910 by simply receiving and/or otherwise accessing the preliminary motion vector data 906 and/or 908 and using that preliminary motion vector data as motion vector data 910.

Moreover, it will be understood that preliminary motion vector data 908 may be generated externally to video encoder 210 by way of any suitable structure or configuration of video encoders, motion determination blocks, or the like. For example, in some implementations, a dedicated preliminary video encoder stage including one or more motion determination blocks may determine preliminary motion vector data 908 for each image 604 included on full atlas frame sequence 220 so as to generate a similar full atlas frame sequence including preliminary motion vector data (e.g., initial or final motion vector data) corresponding to each image 604. As another example, rather than having a preliminary video encoder stage dedicated to generating the preliminary motion vector data, certain implementations may coordinate each of the video encoders 210 to perform a relatively equal share of the work of determining motion vector data for each of the images 604 that are relevant to at least one partial atlas frame sequence. Each of these video encoders 210 may then be configured to intercommunicate to provide one another access to the motion vector data that each video encoder 210 has determined so that work may be efficiently shared rather than redundantly performed by multiple video encoders 210.

In certain examples, preliminary motion vector data 906 and/or 908 may not be immediately or directly usable by video encoder 210, but rather may serve as an efficient starting point for determining motion vector data 910. For instance, in these examples, preliminary motion vector data 906 and/or 908 may need to be refined by motion identification block 902 before being provided to encoding blocks 904 as motion vector data 910.

As one example, while reconstruction system 208 may be able to provide information about motion vectors caused by changes to vantage points from which image sequences in partial atlas frame sequence 222 are depicted, reconstruction system 208 may not have any information to provide about movement of particular objects depicted in different image sequences.

Figure 10B:
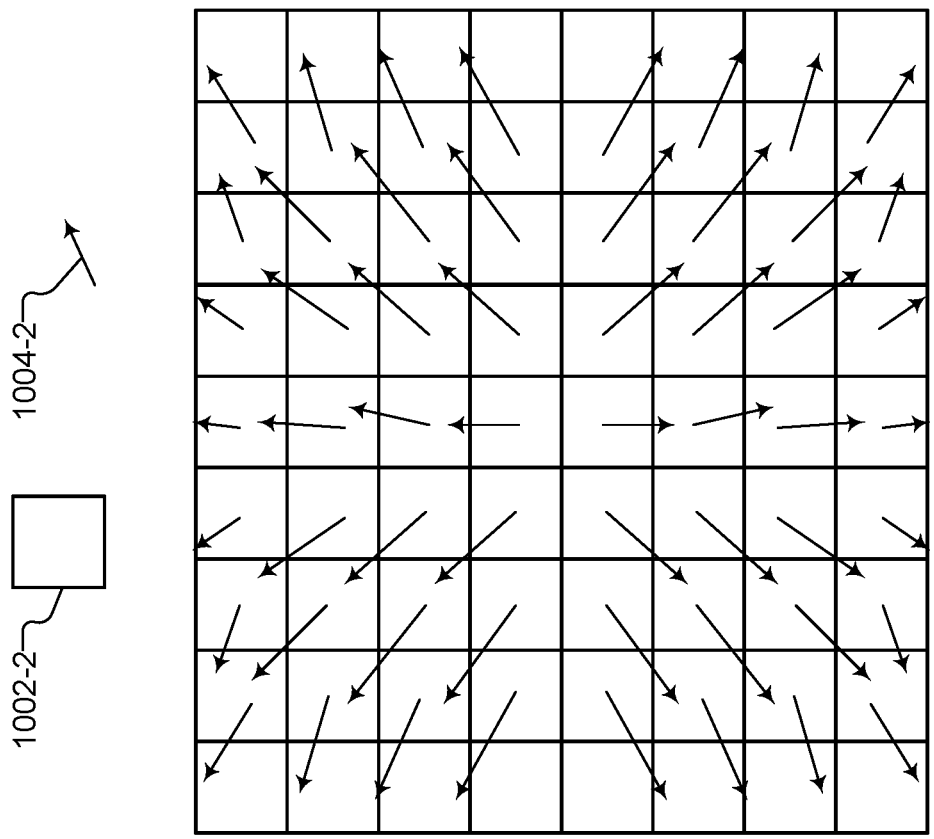
FIGS. 10A and 10B illustrate exemplary motion vector data associated with a transformation from one image to another according to principles described herein.
Figure 10A:
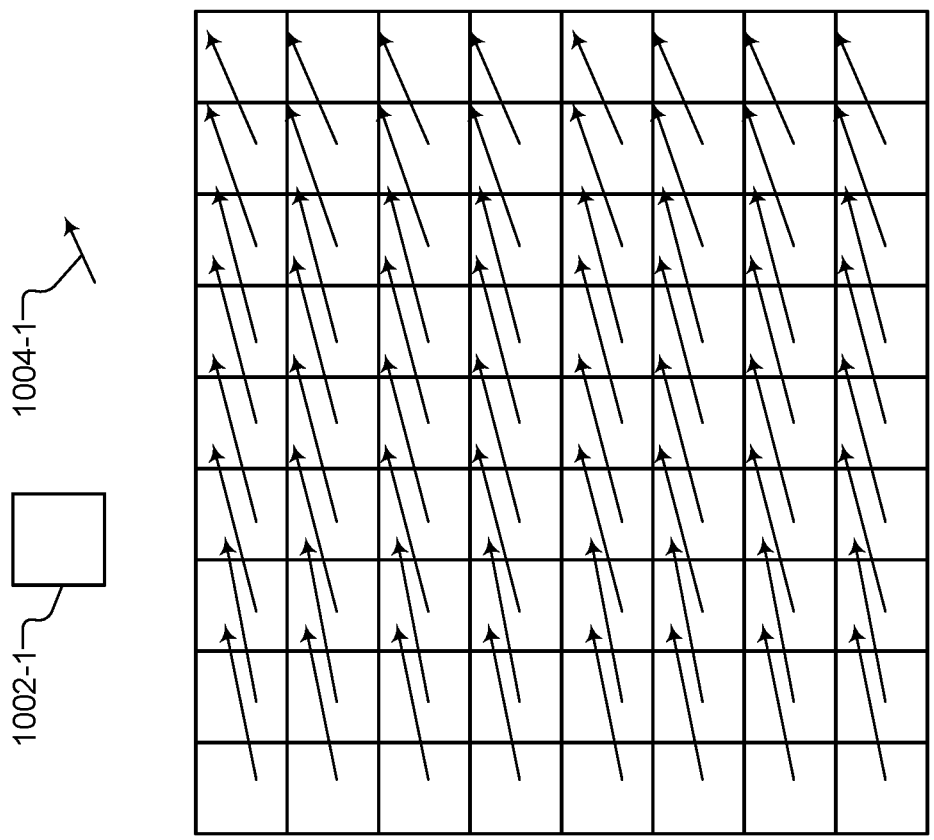

To illustrate, FIG. 10A illustrates exemplary preliminary motion vector data associated with a transformation from one image to another. Specifically, an exemplary implementation 906-1 of preliminary motion vector data 906 may represent a transformation from color data image 702-1C to color data image 702-2C when the vantage point from which images 702 are depicted is moved or rotated down to the left (i.e., so that the image appears to shift upward and to the right). As shown, various image blocks 1002-1 that make up the image may each be associated with different motion vectors 1004-1 (depicted in FIG. 10A as small arrows) that represent the motion of each image block 1002-1 from one image to the next. In different implementations, image blocks 1002-1 and other image blocks described herein may be implemented as a whole image, as specific subparts of the image (e.g., a square or rectangular subpart, an arbitrary-shaped subpart, etc.), or as individual pixels of the image. Thus, for example, FIG. 10A illustrates that each image block 1002-1 shown may move slightly upwards and to the right between the two images for which the motion vectors 1004-1 describe the transformation.

FIG. 10B illustrates another exemplary preliminary motion vector dataset associated with a different transformation. Specifically, an exemplary implementation 906-2 of preliminary motion vector data 906 may represent a transformation from color data image 702-1C to color data image 702-2C when the vantage point from which images 702 are depicted is moved forward or zoomed in (i.e., so that the image appears to get bigger or stretch outward). As shown, various image blocks 1002-2 that make up the image may each be associated with motion vectors 1004-2 that represent the motion of each image block 1002-2 from one image to the next in a similar way as described above in FIG. 10A.

Returning to FIG. 9, while preliminary motion vector data 906 (e.g., data such as illustrated by implementations 906-1 and 906-2, etc.) received from reconstruction system 208 may accurately describe motion caused by changes (e.g., orientation changes, location changes, zoom changes, etc.) to a vantage point, this preliminary motion vector data 906 may not account for motion arising from movement of objects depicted within the images. As such, motion identification 902 may leverage preliminary motion vector data 906 as a starting point for the first pass encoding, but may refine preliminary motion vector data 906 to account for other motion (e.g., motion caused by movement of objects depicted in the image sequence) in motion vector data 910 generated and provided to encoding blocks 904.

Similarly, while preliminary motion vector data 908 may provide a starting point for determining motion vector data 910, additional refinements may need to be made to account for various aspects specific to the image sequences within partial atlas frame sequence 222. For example, preliminary motion vector data 908 could be associated with an image sequence that corresponds to an image sequence included in partial atlas frame sequence 222, but that includes images at a different image resolution from those in the image sequence of partial atlas frame sequence 222. As such, motion identification block 902 may account for the image resolution difference (i.e. as part of the refining of preliminary motion vector data 908 to determine motion vector data 910) by scaling preliminary motion vector data 908 based on a preliminary image resolution associated with preliminary motion vector data 908 and based on a target image resolution associated with motion vector data 910.

In some examples, motion identification block 902 may also append additional information (e.g., data flags, data markers, etc.) to motion vector data 910 being provided so as to further facilitate the second pass encoding to be performed by encoding blocks 904. For example, upon accessing preliminary motion vector data 906 and/or 908, motion identification block 902 may refine preliminary motion vector data 906 and/or 908 to generate motion vector data 910 by designating (e.g., based on preliminary motion vector data 906 and/or 908) a region of a first image (e.g., color data image 702-1C) that is not associated with movement in the transformation from the first image to a second image (e.g., color data image 702-2C). By designating such regions to have no movement, motion identification block 902 may facilitate the second pass encoding because encoding blocks 904 may be able to abstain from analyzing movement with respect to the region of the first image designated to not be associated with movement.

Figure 11:
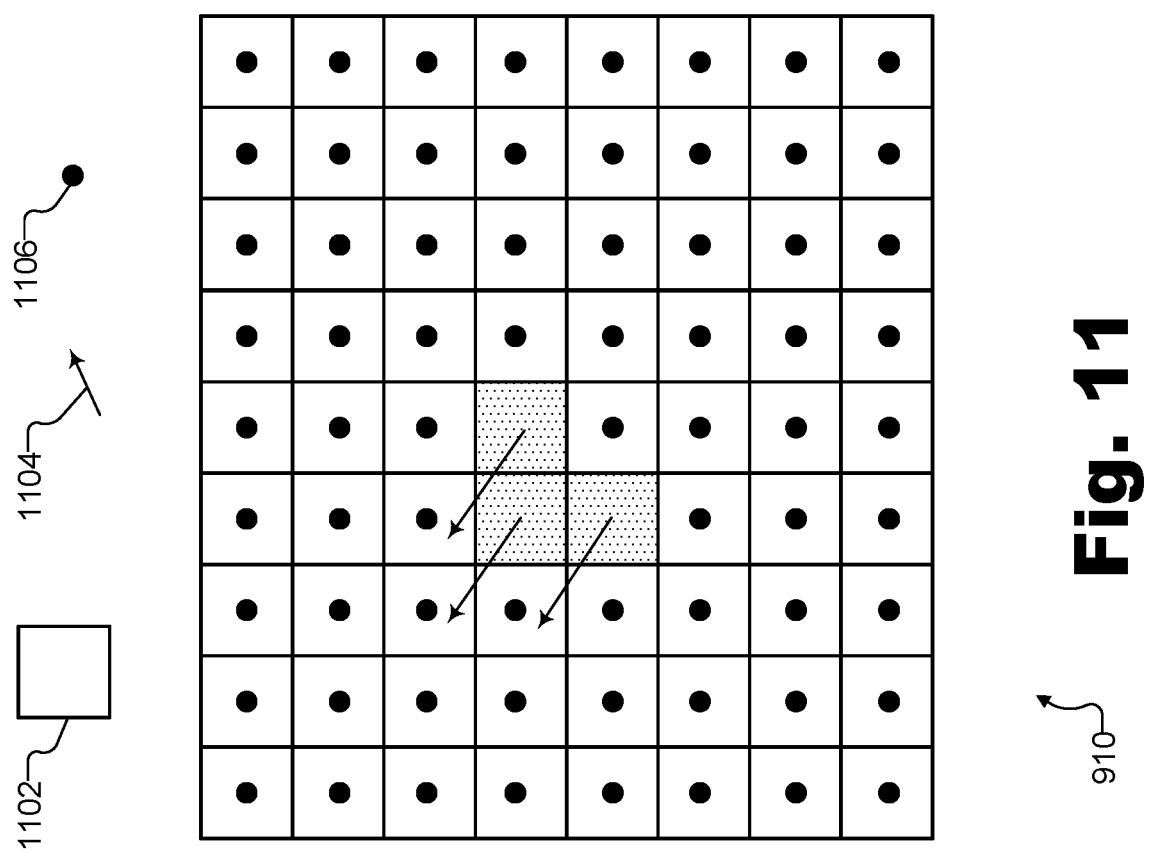
FIG. 11 illustrates exemplary motion vector data that includes exemplary non-motion designations for regions that are not associated with movement in a transformation from one image to another according to principles described herein.

To illustrate, FIG. 11 shows an exemplary implementation of motion vector data 910 for preliminary motion vector data that has been refined and designated to indicate portions not associated with movement. Similar to FIGS. 10A and 10B, FIG. 11 illustrates a plurality of image blocks 1102, each of which is associated with motion vector data. However, while FIGS. 10A and 10B illustrated motion vector data for a transformation that occurred relatively uniformly across an entire image (i.e., due to a change in the vantage point from which the image is depicted), the implementation of motion vector data 910 in FIG. 11 illustrates motion vectors 1104 for only a few image blocks 1102. For example, the image blocks 1102 associated with motion vectors 1104 may be image blocks that represent an object depicted within the image that is moving from one image to the next in the image sequence. The remainder of the image blocks 1102 are each illustrated with a non-movement designation 1106 (depicted as a dot in FIG. 11). Because these image blocks 1102 are designated as not being associated with movement in motion vector data 910, encoder blocks 904 may conserve significant resources in encoding these images because these blocks may be treated as not changing between the images in the image sequence.

Returning to FIG. 9, motion identification block 902 provides motion vector data 910 to both color data encoding block 904-C and depth data encoding block 904-D so that motion vector data 910 can be leveraged for encoding both color data images and depth data images to obtain the efficiency and quality benefits described above. Based on motion vector data 910 identified as part of the first pass encoding, encoding blocks 904-C may perform a second pass video encoding in parallel with one another relatively quickly. For example, because the motion vector data has already been determined in the first pass, the second pass encoding of the color and depth data may require significantly less time and fewer processing resources than would be the case if, as in conventional examples, the motion vector data needed to be determined for both the color data and the depth data from scratch. Based on motion vector data 910, both encoding blocks may perform video encoding of each image sequence included in partial atlas frame sequence 222 using any suitable encoding technique (e.g., HEVC, H.264, H.265, custom encodings, etc.) to encode color data images into a color video stream 912-C and depth data images into a depth video stream 912-D. Color and depth video streams 912-C and 912-D (collectively referred to herein as video streams 912) may be packaged in any suitable data container and then provided as part of a virtual reality dataset 224.

Specifically, as shown in configuration 200 in FIG. 2, each encoder may generate a different virtual reality dataset 224 (e.g., virtual reality datasets 224-1 through 224-M) that may include a plurality of encoded video streams (e.g., such as video streams 912) and other data used by media player devices 214 to present users 216 with desired virtual reality experiences. For example, video encoder 210-1 may generate and provide a virtual reality dataset 224-1 (e.g., implemented as a stream, a file, or the like) to media player devices 214-1 and 214-3, video encoder 210-2 may generate and provide a similar virtual reality dataset 224-2 associated with different vantage points and image sequences to media player device 214-2, and so forth. In this way, each media player device 214 may access a set of image sequences that will allow that media player device 214 to present a particular part of the virtual reality scene (e.g., a part that the respective user 216 of the media player device 214 currently wishes to view) with an appropriate level of detail while remaining efficient by minimizing the amount of unneeded detail provided to each media player device.

Different video encoders 210 may provide color and depth video streams to different media player device 214 in such a way as to allow media player device 214 to render virtual reality media content and present respective users 216 with virtual reality experiences based on virtual reality scene 506 from experience locations within virtual reality scene 506 selected by the users. While conventional video streams may typically be rendered on a screen in a traditional linear manner, it will be understood that the video streams included within each virtual reality dataset 224 may be rendered and presented in a different manner. Specifically, for example, video content encoded in virtual reality datasets 224 may not be configured to be viewed in the traditional way at all, but, rather, may forms part of an overall dataset configured to be rendered to form a three-dimensional virtual reality scene to explored users at will. As such, content represented by each video stream in a particular virtual reality dataset may be rendered only in part along with content represented by other video streams, or the content may be combined and/or otherwise processed so as to recreate a 3D virtual reality scene, rather than to simply present the 2D video content.

In FIG. 2, video encoders 210 are shown to provide virtual reality datasets 224 directly to media player devices 214 by way of network 212. Network 212 may include a provider-specific wired or wireless network (e.g., a cable or satellite carrier network or a mobile telephone network), the Internet, a wide area network, a content delivery network, or any other suitable network. Data may flow between the pipeline illustrated on the provider side of configuration 200 and media player devices 214 on the client side of configuration 200 using any communication technologies, devices, media, and protocols as may serve a particular implementation.

Media player devices 214 may be used by users 216 to access and experience virtual reality datasets 224 generated and provided by video encoders 210. For example, media player devices 214 may be configured to generate (e.g., based on the color video streams and depth video streams included within each virtual reality dataset 224) a 3D representation of virtual reality scene 506 to be experienced by the respective user 216 from an arbitrary experience location (e.g., a dynamically selectable location selected by the user and corresponding to an arbitrary virtual location within virtual reality scene 506). To this end, media player devices 214 may include or be implemented by any device capable of presenting a field of view of a virtual reality scene (e.g., virtual reality scene 506) and detecting user input from a user 216 to dynamically update the content of the virtual reality scene presented within the field of view as the user 216 experiences the virtual reality scene.

Figure 12B:
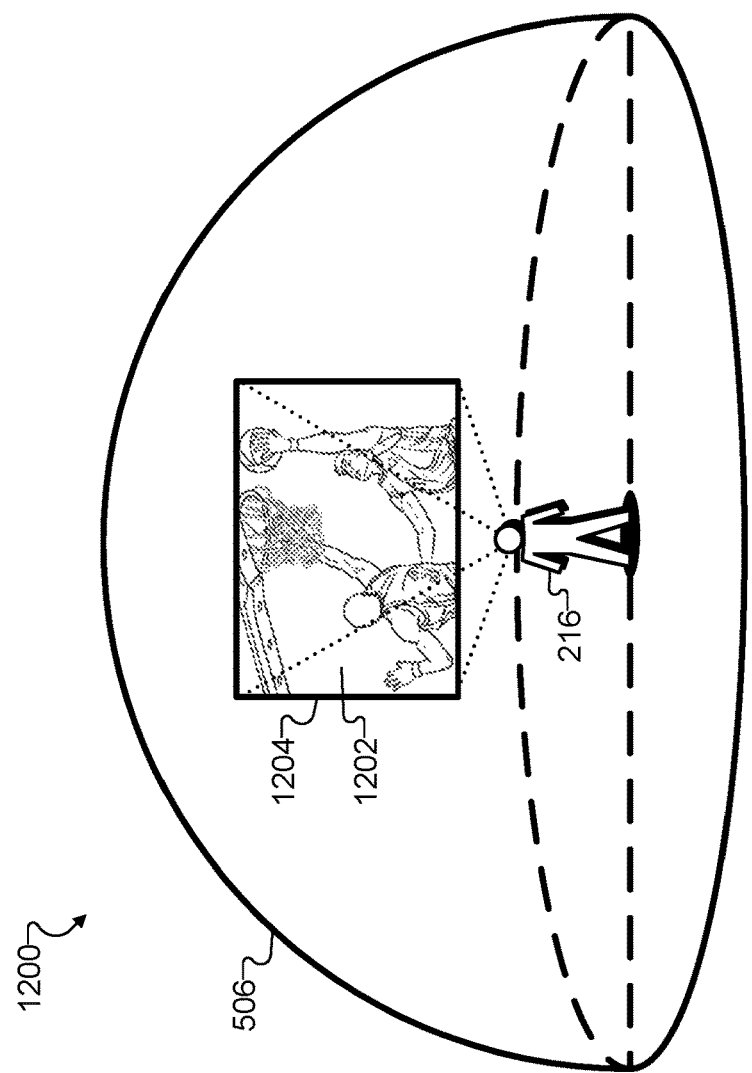
FIG. 12B illustrates an exemplary virtual reality experience according to principles described herein.
Figure 12A:
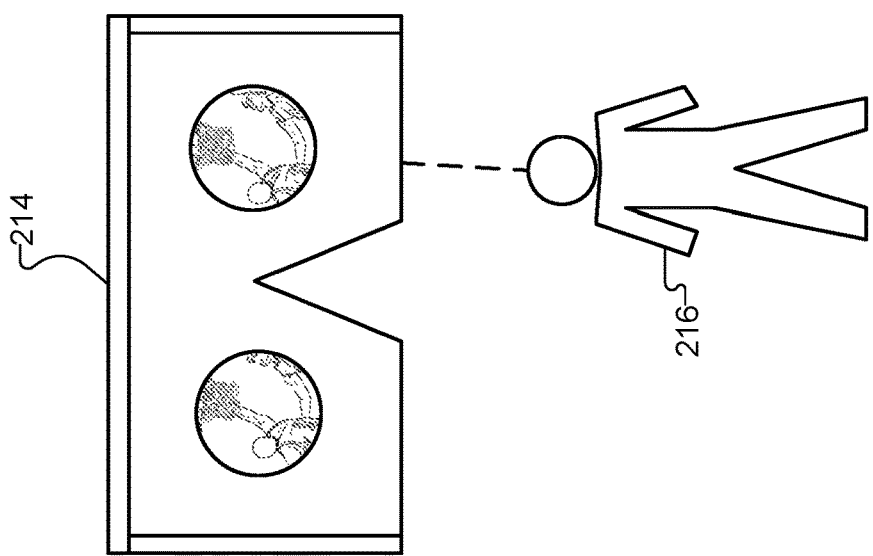
FIG. 12A illustrates an exemplary media player device that may be used by a user to experience virtual reality media content according to principles described herein.

To illustrate, FIG. 12A shows an exemplary media player device 214 that may be used by a user 216 to experience virtual reality media content represented by virtual reality datasets 224. As shown, the exemplary media player device 214 shown in FIG. 12A may be implemented as a head-mounted virtual reality device (e.g., a virtual reality gaming device) that includes a head-mounted display screen. In other examples, other form factors such as a personal computer device (e.g., a desktop computer, laptop computer, etc.), a mobile or wireless device (e.g., a smartphone, a tablet device, etc., possibly mounted to the head of user 216 by means of a head mount apparatus), or another suitable device or configuration of devices may be used.

In some examples, it may be undesirable for user 216 to be limited to one or more discrete positions within the virtual reality scene. As such, the set of available virtual reality datasets 224 that may be requestable and receivable by each media player device 214 may be configured to provide sufficient data to allow virtual scene 300 to be rendered from any dynamically selectable experience location within virtual reality scene 506. For example, the dynamically selectable experience location may be selected by user 216 while user 216 is experiencing virtual reality scene 506 using media player device 214.

As used herein, an "arbitrary experience location" may refer to any virtual point in space associated with a virtual reality scene. For example, arbitrary experience locations are not limited to fixed positions surrounding the virtual reality scene (e.g., fixed positions within virtual reality scene 506 such as positions associated with vantage points 502 or 504), but also include all the positions between the positions associated with the vantage points being used to generate image sequences. In some examples, such arbitrary experience locations may correspond to the most desirable locations from which to experience virtual reality scene 506. For instance, if virtual reality scene 506 depicts a basketball game, user 216 may dynamically select experience locations from which to view the game that are in any arbitrary location on the basketball court. For example, the user may dynamically select his or her experience location to follow the basketball up and down the basketball court so as to experience the basketball game as if standing on the basketball court in the middle of the action of the game. In other words, for example, while vantage points 502 and/or 504 may be positioned at certain positions with respect to the basketball court, user 216 may dynamically select arbitrary experience locations from which to view the game that are associated with any arbitrary position on the basketball court.

FIG. 12B illustrates an exemplary virtual reality experience 1200 in which user 216 is presented with exemplary virtual reality media content representative of virtual reality scene 506 as experienced from a dynamically selectable arbitrary experience location within virtual reality scene 506. Specifically, virtual reality media content 1202 is presented within a field of view 1204 that shows virtual reality scene 506 from an arbitrary experience location right underneath a basketball standard within virtual reality scene 506 where a shot is being made. As shown, virtual reality scene 506 may be available for user 216 to experience by providing user input (e.g., head movements, keyboard input, etc.) to look around and/or to move around (i.e., dynamically select different experience locations within) virtual reality scene 506.

For example, field of view 1204 may provide a window through which user 216 may easily and naturally look around virtual reality scene 506. Field of view 1204 may be presented by media player device 214 (e.g., on a display screen of media player device 214) and may include video depicting objects surrounding user 216 within virtual reality scene 506. Additionally, field of view 1204 may dynamically change in response to user input provided by user 216 as user 216 experiences virtual reality scene 506. For example, media player device 214 may detect user input (e.g., moving or turning the display screen upon which field of view 1204 is presented, changing to a new experience location, etc.). In response, field of view 1204 may display different objects and/or objects seen from a different vantage point or experience location in place of the objects seen from the previous vantage point or experience location.

In FIG. 12B, virtual reality scene 506 is illustrated as a semi-sphere, indicating that user 216 may look in any direction within virtual reality scene 506 that is substantially forward, backward, left, right, and/or up from the experience location under the basketball standard that user 216 has currently selected. In other examples, virtual reality scene 506 may include an entire 360° by 180° sphere such that user 216 may also look down. Additionally, user 216 may move around to other experience locations within virtual reality scene 506. For example, user 26 may select an experience location at half court, an experience location from the free-throw line facing the basketball standard, an experience location suspended above the basketball standard, or the like.

Figure 13:
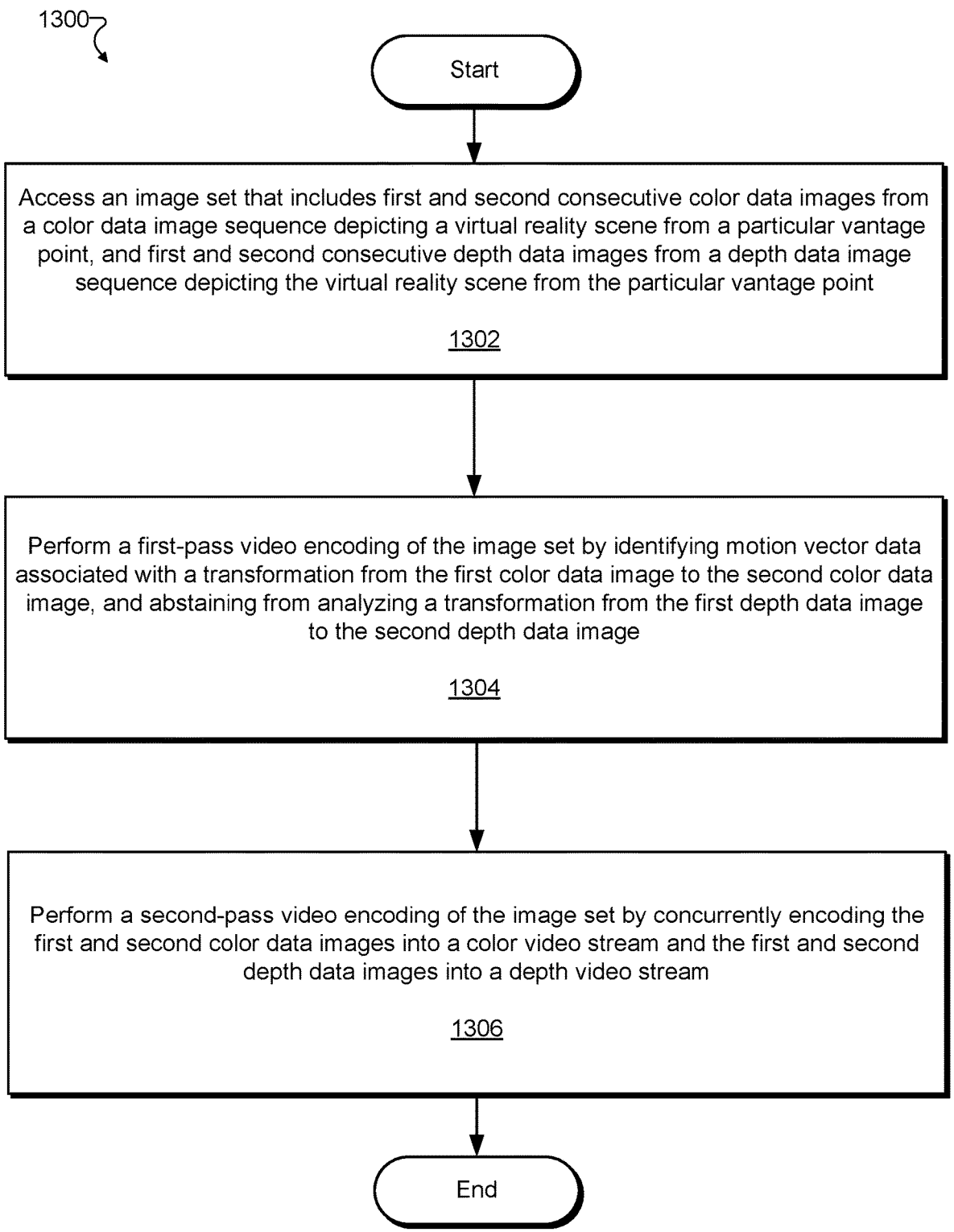
FIG. 13 illustrates an exemplary video encoding method for color and depth data representative of a virtual reality scene according to principles described herein.

FIG. 13 illustrates an exemplary video encoding method for color and depth data representative of a virtual reality scene. While FIG. 13 illustrates exemplary operations according to one embodiment, other embodiments may omit, add to, reorder, and/or modify any of the operations shown in FIG. 13. One or more of the operations shown in FIG. 13 may be performed by system 100 and/or by any implementation thereof.

In operation 1302, a video encoding system may access an image set that includes a plurality of images from a plurality of corresponding image sequences depicting a virtual reality scene from a particular vantage point. Specifically, for example, the image set may include 1) a first color data image included in a color data image sequence depicting a virtual reality scene from a particular vantage point, 2) a second color data image consecutively following the first color data image in the color data image sequence, 3) a first depth data image included in a depth data image sequence depicting the virtual reality scene from the particular vantage point, and 4) a second depth data image consecutively following the first depth data image in the depth data image sequence. In some examples, the first depth data image may correspond to the first color data image and the second depth data image may correspond to the second color data image. Operation 1302 may be performed in any of the ways described herein.

In operation 1304, the video encoding system may perform a first-pass video encoding of the image set. For example, the video encoding system may identify motion vector data associated with a transformation from the first color data image to the second color data image accessed in operation 1302, and may abstain from analyzing a transformation from the first depth data image to the second depth data image. Operation 1304 may be performed in any of the ways described herein.

In operation 1306, the video encoding system may perform a second-pass video encoding of the image set. For example, the video encoding system may encode the first and second color data images into a color video stream to be rendered by a media player device and the first and second depth data images into a depth video stream to be rendered by the media player device. In some examples, the video encoding system may perform the second pass video encoding of the image set based on motion vector data identified in operation 1304. Operation 1306 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 14:
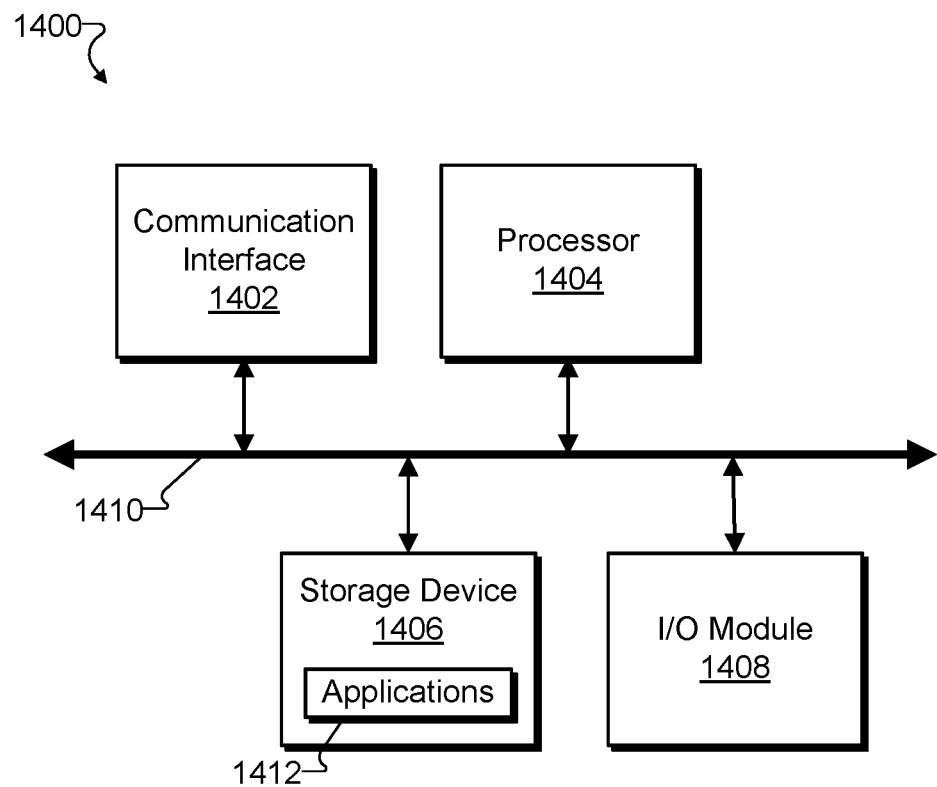
FIG. 14 illustrates an exemplary computing device according to principles described herein.

FIG. 14 illustrates an exemplary computing device 1400 that may be specifically configured to perform one or more of the processes described herein. As shown in FIG. 14, computing device 1400 may include a communication interface 1402, a processor 1404, a storage device 1406, and an input/output ("I/O") module 1408 communicatively connected via a communication infrastructure 1410. While an exemplary computing device 1400 is shown in FIG. 14, the components illustrated in FIG. 14 are not intended to be limiting. Additional or alternative components may be used in other embodiments. Components of computing device 1400 shown in FIG. 14 will now be described in additional detail.

Communication interface 1402 may be configured to communicate with one or more computing devices. Examples of communication interface 1402 include, without limitation, a wired network interface (such as a network interface card), a wireless network interface (such as a wireless network interface card), a modem, an audio/video connection, and any other suitable interface.

Processor 1404 generally represents any type or form of processing unit (e.g., a central processing unit and/or a graphics processing unit) capable of processing data or interpreting, executing, and/or directing execution of one or more of the instructions, processes, and/or operations described herein. Processor 1404 may direct execution of operations in accordance with one or more applications 1412 or other computer-executable instructions such as may be stored in storage device 1406 or another computer-readable medium.

Storage device 1406 may include one or more data storage media, devices, or configurations and may employ any type, form, and combination of data storage media and/or device. For example, storage device 1406 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1406. For example, data representative of one or more executable applications 1412 configured to direct processor 1404 to perform any of the operations described herein may be stored within storage device 1406. In some examples, data may be arranged in one or more databases residing within storage device 1406.

I/O module 1408 may include one or more I/O modules configured to receive user input and provide user output. One or more I/O modules may be used to receive input for a single virtual reality experience. I/O module 1408 may include any hardware, firmware, software, or combination thereof supportive of input and output capabilities. For example, I/O module 1408 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1408 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1400. For example, one or more applications 1412 residing within storage device 1406 may be configured to direct processor 1404 to perform one or more operations or functions associated with facilities 102 through 106 of system 100 (see FIG. 1). Likewise, storage facility 108 may be implemented by or within storage device 1406.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
generating, by an image generation system, a plurality of partial atlas frame sequences that each include a different subset of image sequences selected, from a plurality of image sequences included within a full atlas frame sequence, such that
  each different subset of image sequences includes a unique combination of image sequences distinct from image sequence combinations of every other subset, and
  each different subset of image sequences includes a same particular color data image sequence depicting a virtual reality scene from a particular vantage point and a same particular depth data image sequence depicting the virtual reality scene from the particular vantage point;
accessing, by a video encoding system from the image generation system, a particular partial atlas frame sequence from the plurality of partial atlas frame sequences;

performing, by the video encoding system, a first-pass video encoding of an image set included in the particular partial atlas frame sequence, the performing including
identifying motion vector data associated with a transformation from a first color data image included in the color data image sequence to a second color data image consecutively following the first color data image in the color data image sequence, and
abstaining from analyzing a transformation from a first depth data image included in the depth data image sequence and corresponding to the first color data image to a second depth data image consecutively following the first depth data image in the depth data image sequence and corresponding to the second color data image;
performing, by the video encoding system, a second-pass video encoding of the image set by encoding, based on the identified motion vector data,
the first and second color data images into a color video stream to be rendered by a media player device, and
the first and second depth data images into a depth video stream to be rendered by the media player device; and
providing, by the video encoding system to a different video encoding system that has accessed a different partial atlas frame sequence from the plurality of partial atlas frame sequences, access to the motion vector data identified by the video encoding system.

2. The method of claim 1, wherein the identifying of the motion vector data includes:
analyzing the transformation from the first color data image to the second color data image; and
determining the motion vector data based on the analyzing of the transformation from the first color data image to the second color data image.

3. The method of claim 1, wherein the identifying of the motion vector data includes:
accessing, from the image generation system along with the image set, preliminary motion vector data associated with the transformation from the first color data image to the second color data image, and
refining the preliminary motion vector data accessed from the image generation system to determine the motion vector data.

4. The method of claim 1, further comprising:
accessing, by the different video encoding system from the video encoding system, the motion vector data identified by the video encoding system and associated with the transformation from the first color data image to the second color data image; and
refining, by the different video encoding system, the accessed motion vector data to determine motion vector data for the different partial atlas frame sequence.

5. The method of claim 1, further comprising generating, by the image generation system, the full atlas frame sequence including a plurality of full atlas frames that incorporate the plurality of image sequences from which the different subsets of image sequences are selected.

6. The method of claim 1, wherein the image generation system is configured to:
generate the plurality of image sequences included within the full atlas frame sequence by rendering, based on a volumetric model maintained by the image generation system, each image in the plurality of image sequences included within the full atlas frame sequence; and
provide the full atlas frame sequence to the video encoding system.

7. The method of claim 6, wherein the volumetric model maintained by the image generation system is constructed based on camera-captured data representative of real-world scenery.

8. The method of claim 1, wherein the identifying of the motion vector data includes:
accessing preliminary motion vector data associated with the transformation from the first color data image to the second color data image; and
using the preliminary motion vector data as the motion vector data directly without modifying the preliminary motion vector data.

9. The method of claim 1, wherein the identifying of the motion vector data includes:
accessing preliminary motion vector data associated with the transformation from the first color data image to the second color data image; and
refining the preliminary motion vector data to determine the motion vector data, the refining including scaling the preliminary motion vector data based on a preliminary image resolution associated with the preliminary motion vector data and based on a target image resolution associated with the motion vector data.

10. The method of claim 1, wherein the identifying of the motion vector data includes:
accessing preliminary motion vector data associated with the transformation from the first color data image to the second color data image; and
refining the preliminary motion vector data to determine the motion vector data, the refining including
designating, based on the preliminary motion vector data, a region of the first color data image that is not associated with movement in the transformation from the first color data image to the second color data image, and
abstaining from analyzing movement with respect to the region of the first color data image designated to not be associated with movement.

11. The method of claim 1, further comprising providing, by the video encoding system, the color and depth video streams to the media player device, the providing configured to allow the media player device to present a user with a virtual reality experience based on the virtual reality scene from the particular vantage point.

12. The method of claim 1, embodied as computer-executable instructions on at least one non-transitory computer-readable medium.

13. A system comprising:
an image generation system that includes a first memory storing a first set of instructions and a first processor communicatively coupled to the first memory and configured to execute the first set of instructions to generate a plurality of partial atlas frame sequences that each include a different subset of image sequences selected, from a plurality of image sequences included within a full atlas frame sequence, such that
each different subset of image sequences includes a unique combination of image sequences distinct from image sequence combinations of every other subset, and
each different subset of image sequences includes a same particular color data image sequence depicting a virtual reality scene from a particular vantage point and a same particular depth data image sequence depicting the virtual reality scene from the particular vantage point; and a video encoding system that includes a second memory storing a second set of instructions and a second processor communicatively coupled to the second memory and configured to execute the second set of instructions to:

access, from the image generation system, a particular partial atlas frame sequence from the plurality of partial atlas frame sequences;

perform a first-pass video encoding of an image set included in the particular partial atlas frame sequence, the performing including identifying motion vector data associated with a transformation from a first color data image included in the color data image sequence to a second color data image consecutively following the first color data image in the color data image sequence, and abstaining from analyzing a transformation from a first depth data image included in the depth data image sequence and corresponding to the first color data image to a second depth data image consecutively following the first depth data image in the depth data image sequence and corresponding to the second color data image;

perform a second-pass video encoding of the image set by encoding, based on the identified motion vector data, the first and second color data images into a color video stream to be rendered by a media player device, and the first and second depth data images into a depth video stream to be rendered by the media player device; and provide, to a different video encoding system that has accessed a different partial atlas frame sequence from the plurality of partial atlas frame sequences, access to the motion vector data identified by the video encoding system, the different video encoding system including a third memory storing a third set of instructions and a third processor communicatively coupled to the third memory and configured to execute the third set of instructions.

14. The system of claim 13, wherein the second processor is configured to execute the second set of instructions to perform the identifying of the motion vector data by:
analyzing the transformation from the first color data image to the second color data image; and
determining the motion vector data based on the analyzing of the transformation from the first color data image to the second color data image.

15. The system of claim 13, wherein the second processor is configured to execute the second set of instructions to perform the identifying of the motion vector data by
accessing, from the image generation system along with the image set, preliminary motion vector data associated with the transformation from the first color data image to the second color data image, and
refining the preliminary motion vector data accessed from the image generation system to determine the motion vector data.

16. The system of claim 13, further comprising the different video encoding system, and wherein the third processor is configured to execute the third set of instructions to:

access, from the video encoding system, the motion vector data associated with the transformation from the first color data image to the second color data image; and
refine the accessed motion vector data to determine motion vector data for the different partial atlas frame sequence.

17. The system of claim 13, wherein the first processor is further configured to execute the first set of instructions to generate a full atlas frame sequence including a plurality of full atlas frames that incorporate the plurality of image sequences from which the different subsets of image sequences are selected.

18. The system of claim 13, wherein the second processor is configured to execute the second set of instructions to perform the identifying of the motion vector data by:
accessing preliminary motion vector data associated with the transformation from the first color data image to the second color data image; and
refining the preliminary motion vector data to determine the motion vector data, the refining including
designating, based on the preliminary motion vector data, a region of the first color data image that is not associated with movement in the transformation from the first color data image to the second color data image, and
abstaining from analyzing movement with respect to the region of the first color data image designated to not be associated with movement.

19. The system of claim 13, wherein the second processor is further configured to execute the second set of instructions to provide the color and depth video streams to the media player device so as to allow the media player device to present a user with a virtual reality experience based on the virtual reality scene from the particular vantage point.

20. A system comprising:
an image generation system that includes a first memory storing a first set of instructions and a first processor communicatively coupled to the first memory and configured to execute the first set of instructions, the image generation system configured to generate
a full atlas frame sequence including a plurality of full atlas frames, the full atlas frame sequence including a plurality of image sequences that includes a color data image sequence and a depth data image sequence both depicting a virtual reality scene from a particular vantage point, wherein
the color data image sequence includes a first color data image and a second color data image consecutively following the first color data image, and
the depth data image sequence includes a first depth data image corresponding to the first color data image, and a second depth data image consecutively following the first depth data image and corresponding to the second color data image;
a plurality of partial atlas frame sequences each including a different subset of the image sequences in the plurality of image sequences included in the full atlas frame sequence, the plurality of partial atlas frame sequences including a first partial atlas frame sequence and a second partial atlas frame sequence that each includes the color data image sequence with the first and second color data images and the depth data image sequence with the first and second depth data images;
a first video encoder communicatively coupled to the image generation system and including a second memory storing a second set of instructions and a second processor communicatively coupled to the second memory and configured to execute the second set of instructions to access the first partial atlas frame sequence from the image generation system, perform a first-pass video encoding of the first partial atlas frame sequence by
- determining motion vector data associated with a transformation from the first color data image to the second color data image, and
- abstaining from analyzing a transformation from the first depth data image to the second depth data image, and perform a second-pass video encoding of the first partial atlas frame sequence by encoding, based on the determined motion vector data,
- the first and second color data images into a first color video stream to be rendered by a first media player device, and
- the first and second depth data images into a first depth video stream to be rendered by the first media player device; and a second video encoder communicatively coupled to the image generation system and including a third memory storing a third set of instructions and a third processor communicatively coupled to the third memory and configured to execute the third set of instructions to access the second partial atlas frame sequence from the image generation system, perform a first-pass video encoding of the second partial atlas frame sequence by
- accessing, from the first video encoder, the motion vector data associated with the transformation from the first color data image to the second color data image, and
- abstaining from analyzing the transformation from the first depth data image to the second depth data image, and perform a second-pass video encoding of the second partial atlas frame sequence by encoding, based on the accessed motion vector data,
- the first and second color data images into a second color video stream to be rendered by a second media player device, and
- the first and second depth data images into a second depth video stream to be rendered by the second media player device.

\* \* \* \* \*